US012386908B2

(12) United States Patent
Allieri et al.

(10) Patent No.: US 12,386,908 B2
(45) Date of Patent: Aug. 12, 2025

(54) MACHINE-LEARNED CLASSIFICATION OF NETWORK TRAFFIC

(71) Applicant: Intentsify, LLC, Westwood, MA (US)

(72) Inventors: Charles Ronald Allieri, Wellesley, MA (US); Marco Lagi, Medford, MA (US); Vicent Alabau, Alboraya (ES); Enrique Pons, Alboraya (ES); Ihab Khoury, Alboraya (ES); Caleb Castleberry, Dawsonville, GA (US)

(73) Assignee: Intentsify, LLC, Westwood, MA (US)

(*) Notice: Subject to any disclaimer, the term of this patent is extended or adjusted under 35 U.S.C. 154(b) by 0 days.

(21) Appl. No.: 18/723,793

(22) PCT Filed: Nov. 30, 2023

(86) PCT No.: PCT/IB2023/062101
§ 371 (c)(1),
(2) Date: Jun. 24, 2024

(87) PCT Pub. No.: WO2024/116129
PCT Pub. Date: Jun. 6, 2024

(65) Prior Publication Data
US 2024/0419764 A1 Dec. 19, 2024

Related U.S. Application Data

(60) Provisional application No. 63/581,491, filed on Sep. 8, 2023, provisional application No. 63/385,614, filed on Nov. 30, 2022.

(51) Int. Cl.
G06F 16/00 (2019.01)
G06F 16/951 (2019.01)
(Continued)

(52) U.S. Cl.
CPC ........ *G06F 16/951* (2019.01); *G06F 16/9566* (2019.01); *G06F 16/958* (2019.01); *G06F 18/2415* (2023.01); *G06F 40/279* (2020.01)

(58) Field of Classification Search
CPC .......... G06Q 30/0613; G06Q 30/0254; G06Q 30/0201; G06F 16/9535; G06F 16/9566;
(Continued)

(56) References Cited

U.S. PATENT DOCUMENTS 11,527,092 B1 * 12/2022 Farber .................... G06N 3/088
2009/0254971 A1 10/2009 Herz
(Continued)

OTHER PUBLICATIONS

International Search Report and Written Opinion for PCT/IB2023/062101 dated May 13, 2024, 26 pages.
(Continued)

Primary Examiner — Yicun Wu
(74) Attorney, Agent, or Firm — Miller Johnson

(57) ABSTRACT

A method for classifying network traffic includes accessing processed network data that includes multiple groups. Each group includes multiple URL data objects and is associated with an entity. The method includes generating a dynamic intent score for each group by generating a comparison value for each URL data object within a group, selecting highest comparison values for the URL data objects within the group, generating the dynamic intent score by averaging the selected highest comparison values, and ranking the groups according to their respective dynamic intent scores. The comparison value for each URL data object is generated by scraping a webpage associated with a URL data object to generate a first scraped text data object, creating web embeddings by providing the scraped text data object to a machine learning module, and generating a comparison value by comparing the web embeddings with reference embeddings.

20 Claims, 30 Drawing Sheets

(51) Int. Cl.
　　　*G06F 16/955*　　(2019.01)
　　　*G06F 16/958*　　(2019.01)
　　　*G06F 18/2415*　 (2023.01)
　　　*G06F 40/279*　　(2020.01)

(58) Field of Classification Search
　　　CPC ........ G06F 16/955; G06N 20/00; G06N 3/08; H04L 67/535; H04L 41/16
　　　See application file for complete search history.

(56) References Cited

U.S. PATENT DOCUMENTS

| | | |
|---|---|---|
| 2011/0145717 A1 | 6/2011 | Joo |
| 2014/0279793 A1 | 9/2014 | Wohlstadter |
| 2015/0081682 A1 | 3/2015 | Frydl |
| 2015/0169562 A1 | 6/2015 | Connor |
| 2020/0410053 A1 | 12/2020 | Zhang et al. |
| 2021/0264902 A1 | 8/2021 | Larson et al. |
| 2022/0129630 A1 | 4/2022 | Costa et al. |
| 2022/0188698 A1 | 6/2022 | Halecky et al. |
| 2022/0279220 A1 | 9/2022 | Khavronin |

OTHER PUBLICATIONS

Bijoy, Mehedi Hasan, et al. "Image Tagging by Fine-tuning Class Semantics Using Text Data from Web Scraping." 2021 24th International Conference on Computer and Information Technology (ICCIT). IEEE, 2021.

Elnawawy, Mohammed, Assim Sagahyroon, and Tamer Shanableh. "FPGA-based network traffic classification using machine learning." IEEE Access 8 (2020): 175637-175650.

EPO, Supplementary European Search Report for EP app. No. 23897033.9, dated Feb. 5, 2025.

EPO, European Search Report for EP app. No. 24190958.9, dated Nov. 13, 2024.

EPO, Communication pursuant to Article 64(3) EPC for EP app. No. 24190958.9, dated Nov. 26, 2024.

Maladkar, "Content Based Hierarchical URL Classification with Convolutional Neural Networks", 2019 International Conference on Information Technology (ICIT), IEEE, Dec. 19, 2019.

European Patent Office, European Office Action regarding Application No. 23897033.9, mailed Feb. 17, 2025.

* cited by examiner

MACHINE-LEARNED CLASSIFICATION OF NETWORK TRAFFIC

CROSS-REFERENCE TO RELATED APPLICATIONS

This application is a National Stage of International Application No. PCT/IB2023/062101 filed Nov. 30, 2023, which claims the benefit of U.S. Provisional Application No. 63/581,491 filed Sep. 8, 2023 and U.S. Provisional Application No. 63/385,614 filed Nov. 30, 2022.

FIELD

The present disclosure relates to network traffic analysis and classification and, more particularly, to machine-learning-implemented network traffic analysis and classification systems and techniques.

BACKGROUND

Modern communications networks—such as the Internet—generate a massive amount of diverse traffic and data. As network traffic increases in volume and grows ever more diverse, the accurate, effective, and computationally-efficient monitoring, classification, and analysis of network traffic becomes more and more difficult. Generally, network packets include one or more headers—such as an Internet Protocol (IP) header and a Transmission Control Protocol (TCP) header—followed by a payload, such as application data. Shallow packet inspection techniques inspect a network packet's headers to identify the source and destination IP addresses, as well as TCP information such as port information. Shallow inspection techniques—such as port-based network traffic classification solutions—are simple, fast, and do not require intensive computer resources to implement. However, because they rely only on header information to classify and analyze network traffic, they deliver only a limited amount of information to network administrators and are susceptible to being deceived by harmful applications that use non-standard or spoofed header information to disguise their payloads.

Other techniques—such as deep packet inspection (DPI)—make up for some of the shortcomings of header-based classification. DPI inspects the application data of the network packet to match the application data to "signatures" found in signature databases. For example, DPI techniques may parse the application data for specific strings and attempt to match the specific strings to signatures. The network traffic may then be classified according to its signature. However, because DPI techniques require access to the application data, DPI techniques do not work with network packets having encrypted payloads. Furthermore, because DPI techniques parse and analyze the content of the application data, DPI techniques become computationally intensive when applied to a heavy volume of network traffic. Additionally, the accuracy of DPI techniques is limited by the quality of the signature databases—the lower the quality of the signature database, the lower the quality of DPI-based networked classification. Thus, given the shortcomings of shallow and deep packet inspection techniques, there is a need for network classification techniques that are able to reliably generate intent data associated with network traffic that do not require access to the payload of the network packets.

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

A computer-implemented method for classifying network traffic according to machine learning includes accessing processed network data. The processed network data includes a plurality of groups. Each group includes a plurality of URL data objects. Each group is associated with an entity. The method includes generating a dynamic intent score for each group by generating a comparison value for each URL data object within a group, selecting highest comparison values for the URL data objects within the group, generating the dynamic intent score by averaging the selected highest comparison values, and ranking groups of the plurality of groups according to their respective dynamic intent scores. The comparison value for each URL data object within a group is generated by scraping a webpage associated with a URL data object to generate a first scraped text data object, creating web embeddings by providing the scraped text data object to a machine learning module, and generating a comparison value by comparing the web embeddings with reference embeddings.

In other features, creating web embeddings includes generating an input vector based on the scraped text data object, providing the input vector to a trained neural network to generate an output vector, and saving the output vector of the trained neural network as web embeddings. In other features, the trained neural network includes an input layer having a plurality of nodes, one or more hidden layers having a plurality of nodes, and an output layer having a plurality of nodes. In other features, each node of the input layer is connected to at least one node of the one or more hidden layers, each node of the input layer represents a numerical value, and the at least one node of the one or more hidden layers receives the numerical value multiplied by a weight as an input. In other features, the at least one node of the one or more hidden layers receives the numerical value multiplied by the weight and offset by a bias as the input.

In other features, the at least one node of the one or more hidden layers is configured to sum inputs received from nodes of the input layer, provide the summed inputs to an activation function, and provide an output of the activation function to one or more nodes of a next layer. In other features, the web embeddings includes a first vector and the reference embeddings includes a second vector. In other features, the comparison value includes results of a cosine similarity taken between the first vector and the second vector. In other features, the comparison value is in a range of between about −1 and about 1. In other features, the comparison value is in a range of between about 0 and about 1. In other features, each URL data object includes an Internet Protocol (IP) address string, a Uniform Resource Locator (URL) string, and an identifier of the group associated with the IP address. In other features, each URL data object includes a cookie ID string, a Uniform Resource Locator (URL) string, and an identifier of the group associated with the cookie ID string.

In other features, the reference embeddings are generated by generating an input vector based on a string of text input by a user at a user interface, providing the input vector to a trained neural network to generate an output vector, and saving the output vector of the trained neural network as web embeddings. In other features, the reference embeddings are generated by generating an input vector based on text input by a user at a user interface, providing the input vector to a trained neural network to generate an output vector, and saving the output vector of the trained neural network as web embeddings. In other features, the reference embeddings are generated by generating an input vector based on text extracted from a file uploaded by a user at a user interface, providing the input vector to a trained neural network to generate an output vector, and saving the output vector of the trained neural network as web embeddings.

In other features, the text is extracted from the file using optical character recognition (OCR). In other features, the reference embeddings are generated by generating an input vector based on text extracted from a topic list, providing the input vector to a trained neural network to generate an output vector, and saving the output vector of the trained neural network as web embeddings. In other features, the computer-implemented method includes generating a stage score for each URL data object by parsing text of a webpage associated with the URL data object to determine a number of times topics from a topic list appears in the text of the webpage, determine a weight based on a distance between the webpage and a campaign description, and generating the stage score by determining a number of times topics from the topic list appear in the text of the webpage. In other features, the computer-implemented method includes generating an entity stage score for the selected group by aggregating stage scores of the URL data objects.

A system for classifying network traffic according to machine learning includes one or more data stores including processed network data. The processed network data includes a plurality of groups. Each group includes a plurality of URL data objects. Each group is associated with an entity. The system includes one or more software modules configured to generate a dynamic intent score for each group by generating a comparison value for each URL data object within a group, selecting highest comparison values for the URL data objects within the group, generating the dynamic intent score by averaging the selected highest comparison values, and ranking groups of the plurality of groups according to their respective dynamic intent scores. The one or more software modules are configured to generate the comparison value for each URL data object within the group by scraping a webpage associated with a URL data object to generate a first scraped text data object, creating web embeddings by providing the scraped text data object to a machine learning module, and generating a comparison value by comparing the web embeddings with reference embeddings.

A non-transitory computer-readable medium includes executable instructions for classifying network traffic according to machine learning. The executable instructions include accessing processed network data. The processed network data includes a plurality of groups. Each group includes a plurality of URL data objects. Each group is associated with an entity. The executable instructions include generating a dynamic intent score for each group by generating a comparison value for each URL data object within a group, selecting highest comparison values for the URL data objects within the group, generating the dynamic intent score by averaging the selected highest comparison values, and ranking groups of the plurality of groups according to their respective dynamic intent scores. The executable instructions include generating the comparison value for each URL data object within the group by scraping a webpage associated with a URL data object to generate a first scraped text data object, creating web embeddings by providing the scraped text data object to a machine learning module, and generating a comparison value by comparing the web embeddings with reference embeddings.

A computer-implemented method includes receiving target input data that includes keyword input data. The method includes accessing processed network data. The processed network data includes a plurality of groups, each group of the plurality of groups includes a plurality of URL data objects, and each group of the plurality of groups is associated with an entity. The method includes generating a dynamic intent score for each group of the plurality of groups by, for each URL data object of the plurality of URL data objects of the group, extracting keywords from a webpage associated with the URL data object that are similar to keywords of the target input data, comparing the extracted keywords with the keywords of the target input data, generating a keyword comparison value for the URL data object based on the comparison, and generating the dynamic intent score based on the keyword comparison values of the plurality of URL data objects of the groups. The method includes ranking the plurality of groups according to their respective dynamic intent scores, selecting a subset of the plurality of groups according to the ranking, and generating a target account list including the entities associated with the subset of the plurality of groups.

In other features, the target account list includes respective domain names associated with the entities associated with the ranked groups. In other features, the target account list sorts the entities associated with the ranked groups in alphabetic order of their respective domain names. In other features, the target account list sorts the entities associated with the ranked groups in order of their respective dynamic intent scores. In other features, the target account list is encoded as a text file format.

In other features, the computer-implemented method includes outputting the target account list to a graphical user interface. In other features, the target input data originates from a user who requests creation of the target account list. In other features, the keyword input data includes user-specified keywords to locate in the webpages associated with the URL data objects. In other features, generating the dynamic intent score for each group of the plurality of groups includes averaging the keyword comparison values of the plurality of URL data objects of the group. In other features, the target input data includes topic input data. The topic input data includes user-specified topics to locate in the webpages associated with the URL data objects.

In other features, generating the dynamic intent score for each group of the plurality of groups includes, for each URL data object of the plurality of URL data objects of the group, creating target input data embeddings, scraping the webpage associated with the URL data object to generate a scraped text data object, creating web embeddings by providing the scraped text data object to a machine learning module, generating a topic comparison value by comparing the web embeddings with the target input data embeddings, generating a total comparison value for the URL data object by combining (i) the keyword comparison value and (ii) the topic comparison value, and generating the dynamic intent score based on the total comparison values of the plurality of URL data objects.

In other features, the target input data includes website input data. The website input data includes a user-specified set of websites to locate similar websites. In other features, generating the dynamic intent score for each group of the plurality of groups includes, for each URL data object of the plurality of URL data objects of the group, creating target input data embeddings, scraping the webpage associated with the URL data object to generate a scraped text data object, creating web embeddings by providing the scraped text data object to a machine learning module, generating a website comparison value by comparing the web embeddings with the target input data embeddings, generating a total comparison value for the URL data object by combining (i) the keyword comparison value and (ii) the website comparison value, and generating the dynamic intent score based on the total comparison values of the plurality of URL data objects.

A system includes memory hardware configured to store instructions and one or more data stores including processed network data. The processed network data includes a plurality of groups. Each group of the plurality of groups includes a plurality of URL data objects. Each group of the plurality of groups is associated with an entity. The instructions include accessing the processed network data. The instructions include generating a dynamic intent score for each group of the plurality of groups by, for each URL data object of the plurality of URL data objects of the group, extracting keywords from a webpage associated with the URL data object that are similar to keywords of the target input data, comparing the extracted keywords with the keywords of the target input data, generating a keyword comparison value for the URL data object based on the comparison, and generating the dynamic intent score based on the keyword comparison values of the plurality of URL data objects of the groups. The instructions include ranking the plurality of groups according to their respective dynamic intent scores, selecting a subset of the plurality of groups according to the ranking, and generating a target account list including the entities associated with the subset of the plurality of groups.

A non-transitory computer-readable medium storing processor-executable instructions. The instructions include accessing processed network data. The processed network data includes a plurality of groups, each group of the plurality of groups includes a plurality of URL data objects, and each group of the plurality of groups is associated with an entity. The instructions include generating a dynamic intent score for each group of the plurality of groups by, for each URL data object of the plurality of URL data objects of the group, extracting keywords from a webpage associated with the URL data object that are similar to keywords of the target input data, comparing the extracted keywords with the keywords of the target input data, generating a keyword comparison value for the URL data object based on the comparison, and generating the dynamic intent score based on the keyword comparison values of the plurality of URL data objects of the groups. The instructions include ranking the plurality of groups according to their respective dynamic intent scores, selecting a subset of the plurality of groups according to the ranking, and generating a target account list including the entities associated with the subset of the plurality of groups.

Further areas of applicability of the present disclosure will become apparent from the detailed description, the claims, and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings.

In the drawings, reference numbers may be reused to identify similar and/or identical elements.

DETAILED DESCRIPTION

System Overview

Figure 1A:
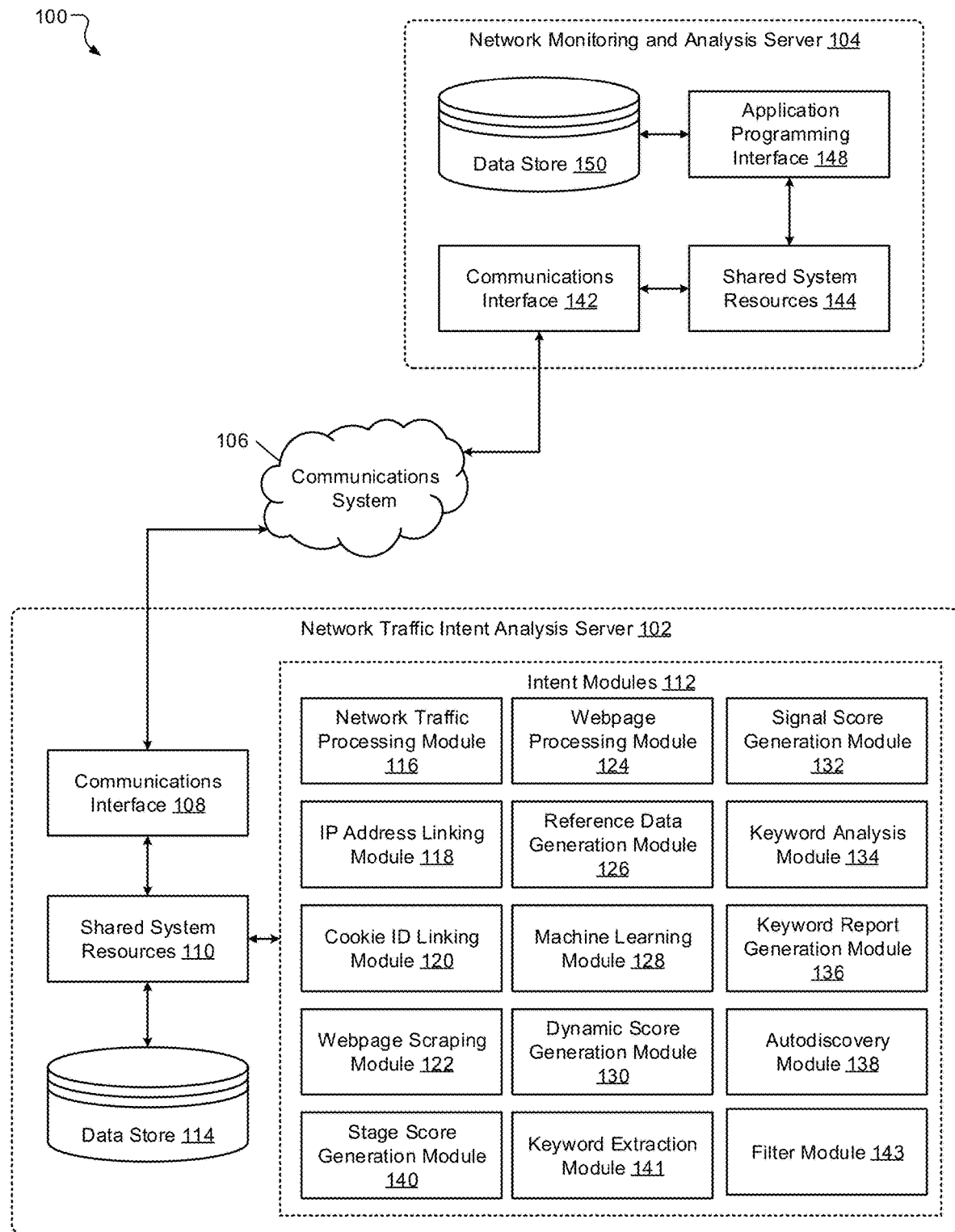
FIG. 1A is a functional block diagram of an example system for analyzing and classifying network traffic using artificial intelligence.

FIG. 1A is a functional block diagram of an example system 100 for analyzing and classifying network traffic using artificial intelligence—such as machine learning models. In various implementations, the system 100 may include one or more servers—such as network traffic intent analysis server 102 network monitoring and analysis server 104—and operatively coupled via one or more communications systems—such as communications system 106. In various implementations, the network traffic intent analysis server 102 may communicate with the network monitoring and analysis server 104 via the communications system 106.

Examples of the communications system 106 may include one or more networks, such as a General Packet Radio Service (GPRS) network, a Time-Division Multiple Access (TDMA) network, a Code-Division Multiple Access (CDMA) network, a Global System of Mobile Communications (GSM) network, an Enhanced Data Rates for GSM Evolution (EDGE) network, a High-Speed Packet Access (HSPA) network, an Evolved High-Speed Packet Access (HSPA+) network, a Long Term Evolution (LTE) network, a Worldwide Interoperability for Microwave Access (WiMAX) network, a 5th-generation mobile network (5G), an Internet Protocol (IP) network, a Wireless Application Protocol (WAP) network, or an IEEE 802.11 standards network, as well as any suitable combination of the above networks. In various implementations, the communications system 106 may also include an optical network, a local area network, and/or a global communication network, such as the Internet.

As shown in FIG. 1A, the network traffic intent analysis server 102 may include a communications interface 108, shared system resources 110, one or more intent modules 112, and one or more data stores including non-transitory computer-readable storage media, such as data store 114. In various implementations, the communications interface 108 may be suitable for communicating with other communications interfaces over the communications system 106. In various implementations, the communications interface 108 may include a transceiver suitable for sending and/or receiving data to and from other communications interfaces over the communications system 106. In various implementations, the shared system resources 110 may include one or more processors, volatile and/or non-volatile computer memory—such as random-access memory, system storage—such as non-transitory computer-readable storage media, and one or more system buses connecting the components.

In various implementations, the communications interface 108, the intent modules 112, and/or the data store 114 may be operatively coupled to the shared system resources 110 and/or the operatively coupled to each other through the shared system resources 110. In various implementations, the intent modules 112 may be software modules stored on non-transitory computer-readable storage media. In various implementations, the intent modules 112 may include a network traffic processing module 116, an IP address linking module 118, a cookie ID linking module 120, a webpage scraping module 122, a webpage processing module 124, a reference data generation module 126, a machine learning module 128, a dynamic score generation module 130, a signal score generation module 132, a keyword analysis module 134, a keyword report generation module 136, an autodiscovery module 138, a stage score generation module 140, and/or a keyword extraction module 141.

The network traffic processing module 116 may be configured to retrieve, merge, and process network data. The IP address linking module 118 may be configured to retrieve IP address mapping data and link IP addresses present in network data to entities according to the IP address mapping data. In various implementations, the IP address linking module 118 may be configured to link IP addresses to geographic origins—such as cities, states, and/or countries. The cookie ID linking module 120 may be configured to retrieve cookie ID mapping data and link cookie IDs present in network data to entities according to the cookie ID mapping data. The webpage scraping module 122 may be configured to access webpages and extract text from the accessed webpages. The webpage processing module 124 may be configured to further process the text extracted by the webpage scraping module 122. In various implementations, the webpage processing module 124 may prepare the text extracted by the webpage scraping module 122 for use as input variables for machine learning models. The reference data generation module 126 may be configured to parse text, webpages, and/or files—such documents generated by word processing programs, Portable Document Format (PDF) files, and/or images containing text—and generate reference data. In various implementations, the reference data generation module 126 may be configured to prepare the reference data for use as input variables for machine learning models.

The machine learning module 128 may include any machine learning model suitable for natural language processing (NLP). For example, the machine learning module 128 may include a pretrained NLP system implemented by neural networks. The dynamic score generation module 130 may be configured to perform analysis and/or classification of network data using outputs variables of the machine learning module 128. The signal score generation module 132 may be configured to perform analysis and/or classification of network data using output variables of the machine learning module 128. The keyword analysis module 134 may be configured to parse text and generate keywords. The keyword report generation module 136 may be configured to generate reports based on generated keywords. The autodiscovery module 138 may be configured to parse and process network data generated by the webpage processing module 124 and/or reference data generated by the reference data generation module 126 to automatically generate keywords and scores.

The stage score generation module 140 may be configured to automatically parse network data generated by the webpage processing module 124 and/or reference data generated by the reference data generation module 126 to generate metrics for characterizing and analyzing the network data. More detailed functionality and programming of the intent modules 112 will be described later on with reference to detailed drawings and/or flowcharts showing programming algorithms.

As shown in FIG. 1A, the network monitoring and analysis server 104 may include a communications interface 142, shared system resources 144, an application programming interface 148, and one or more data stores including non-transitory computer-readable storage media, such as data store 150. In various implementations, the communications interface 142 may be suitable for communicating with other communications interfaces—such as communications interface 108—over the communications system 106. In various implementations, the communications interface 142 may include a transceiver suitable for sending and/or receiving data to and from communications interface 108 over the communications system 106. In various implementations, the shared system resources 144 may include one or more processors, volatile and/or non-volatile computer memory—such as random-access memory, system storage—such as non-transitory computer-readable storage media, and one or more system buses connecting the components.

In various implementations, the application programming interface 148 may include one or more software modules stored on non-transitory computer-readable storage media. In various implementations, the communications interface 142, application programming interface 148, and/or data store 150 may be operatively coupled to the shared system resources 144 and/or operatively coupled to each other via the shared system resources 144. In various implementations, the intent modules 112 may access the application programming interface 148 via the shared system resources 110, communications interface 108, communications system 106, communications interface 142, and/or shared system resources 144. In various implementations, the application programming interface 148 may be a software module providing an interface for other software and/or hardware modules—such as the intent modules 112—to access data store 150.

Figure 1B:
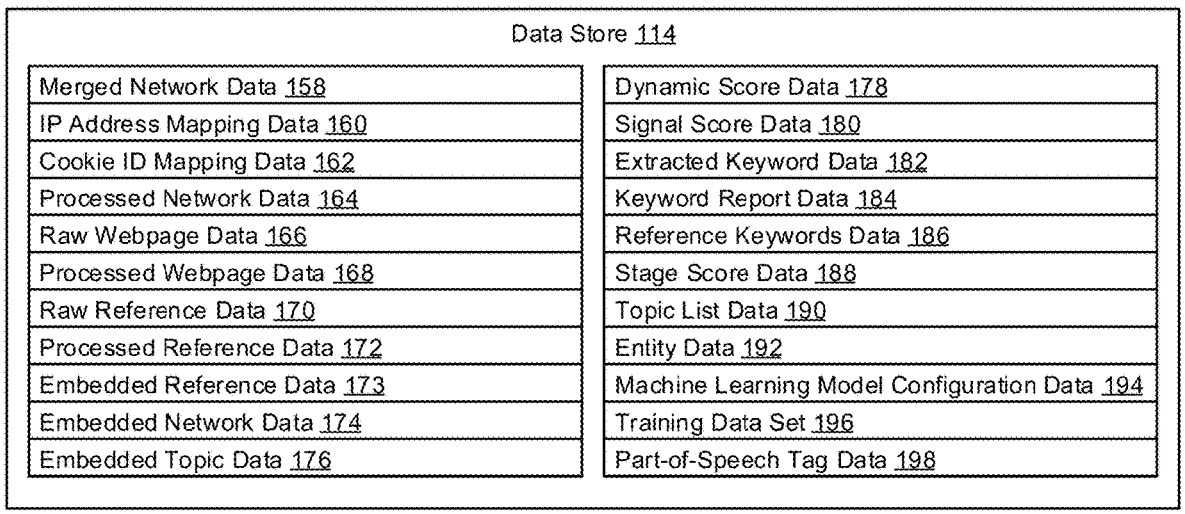
FIG. 1B is a block diagram showing example data structures that may be stored in data stores of a system.

FIG. 1B is a block diagram showing example data structures that may be stored in data stores of the system 100. In various implementations, each of the data structures of data store 114 and/or data store 150 may include any combination of flat files and relational databases—such as Structured Query Language (SQL) tables. In various implementations, data store 150 may include raw network data 152, raw network data 154, and/or raw network data 156. In various implementations, raw network data 152, raw network data 154, and/or raw network data 156 may be stored in SQL tables. In various implementations, raw network data—such as raw network data 152, raw network data 154, and/or raw network data 156—may include information indicative of the network traffic of one or more entities. For example, the raw network data may include data indicative of the Internet browsing behavior of entities. For example, one or more rows of the raw network data may include an IP address (indicative of the browsing entity), a Uniform Resource Locator (URL) (accessed by the browsing entity), and a date-time field (indicating the date and time that the browsing entity accessed the URL).

In various implementations, one or more rows of the raw network data may include a cookie ID (indicative of the browsing entity), a URL (accessed by the browsing entity), and a date time field (indicating the date and time that the browsing entity accessed the URL). In various implementations, the date-time field may be in Coordinated Universal Time (UTC). In various implementations, the raw network data may be generated from advertisement tracking data. For example, an advertisement may be placed on a website. When an entity accesses the website with the advertisement, the entity will also send a request to the host of the advertisement to load the advertisement. Raw network data may be captured based on the request to load the advertisement. In various implementations, the raw network data may be generated from tracking pixels. For example, tracking-pixel data may be generated using tracking pixels placed on websites. When an entity accesses the website with the tracking pixel, the entity will also send a request to the host of the tracking pixel to load the pixel. Raw network data may be captured based on the request to load the tracking pixel.

In various implementations, raw network data may be captured through one or more graphical user interface elements placed on websites. For example, the graphical user interface element may be an image (which may only be a single pixel) or a button for sharing a link to the website. In various implementations, raw network data related to the entity clicking the button may be captured. In various implementations, raw network data related to the entity accessing the website via the link may be captured. In various implementations, web analytics may be generated for websites, and raw network data of entities accessing the websites may be generated from the web analytics. In various implementations, the raw network data may be processed by the system 100 in order to determine the "intent" of entities corresponding to the raw network data. Accordingly, in various implementations, the raw network data may also be referred to as raw intent data. In various implementations, the raw network data—such as raw network data 152, raw network data 154, and/or raw network data 156—may be copied to data store 114.

In various implementations, data store 114 may include merged network data 158, IP address mapping data 160, cookie ID mapping data 162, processed network data 164, raw webpage data 166, processed webpage data 168, raw reference data 170, processed reference data 172, embedded reference data 173, embedded network data 174, embedded topic data 176, dynamic score data 178, signal score data 180, extracted keyword data 182, keyword report data 184, reference keywords data 186, stage score data 188, topic list data 190, entity data 192, machine learning model configuration data 194, training data set 196, and/or part-of-speech tag data 198.

In various implementations, merged network data 158 may include one or more rows of the raw network data 152, raw network data 154, and/or raw network data 156 merged into a single SQL table. In various implementations, the IP address mapping data 160 may include data associating IP addresses with an entity. In various implementations, the IP address mapping data 160 may be a flat file. In various implementations, the cookie ID mapping data 162 may include data associating cookie IDs with an entity. In various implementations, the processed network data 164 may include deduplicated and filtered raw intent data, where each row is associated with an entity. In various implementations, the processed network data 164 may also indicate a geographical location of the entity—such as the city, state, and/or country the entity is located in.

In various implementations, raw webpage data 166 may include text extracted from webpages. For example, raw webpage data 166 may include text generated by webpage scraping module 122. In various implementations, processed webpage data 168 may include text from raw webpage data 166 that has been processed to be suitable for use as input vectors for machine learning models. For example, processed webpage data 168 may include text generated by webpage processing module 124. In various implementations, the raw reference data 170 may include reference text data, such as text data extracted from text strings, webpages, documents, files, and/or images. In various implementations, processed reference data 172 may include text from raw reference data 170 that has been processed to be suitable for use as input vectors for machine learning models. In various implementations, raw reference data 170 and/or processed reference data 172 may include text generated by the reference data generation module 126.

In various implementations, embedded reference data 173 and/or embedded network data 174 may include output vectors from trained machine learning models, such as machine learning models used to implement machine learning module 128. In various implementations, embedded network data 174 may include signed vectors. In various implementations, embedded network data 174 may include output vectors from trained machine learning models where the input vectors include text from processed webpage data 168. In various implementations, embedded topic data 176 may include output vectors from trained machine learning models, such as machine learning models used to implement machine learning module 128. In various implementations, embedded topic data 176 may include signed vectors. In various implementations, embedded topic data 176 may include output vectors from trained machine learning models where the input vectors include text from topic list data 190.

In various implementations, dynamic score data 178 may include output data generated by the dynamic score generation module 130. In various implementations, signal score data 180 may include output data generated by the signal score generation module 132. In various implementations, extracted keyword data 182 may include data generated by the keyword analysis module 134. In various implementations, keyword report data 184 may include data generated by the keyword report generation module 136. In various implementations, reference keywords data 186 may include data generated by the autodiscovery module 138. In various implementations, stage score data 188 may include data generated by the stage score generation module 140.

In various implementations, topic list data 190 may include topic lists—such as text strings indicating topic names and/or text strings describing the topics. In various implementations, the topic lists may include flattened interpretations of topic taxonomies. In various implementations, entity data 192 may include data about entities. Entities may include any individual or organization—such as corporations, schools, and/or government agencies. In various implementations, entity data 192 may include accounts, with each account representing an entity for which the system 100 is configured to perform intent-based classification and analysis based on the entity's network data. In various implementations, machine learning model configuration data 194 include parameters—such as learnable parameters—of machine learning models. For example, if the machine learning module 128 is implemented with a neural network, then the machine learning model configuration data 194 may include weights and/or biases for the neural network.

In various implementations, training data set 196 may include data used to train the neural network used to implement machine learning module 128. Training data set 196 may be selected based on the desired application of system 100. For example, if the system 100 is used in business-to-business applications, then the training data set 196 may include text relevant to the business-to-business context—such as sentences describing commercial transactions. In various implementations, part-of-speech tag data 198 may include data and/or software libraries configured for part-of-speech tagging. The data and/or software libraries may be configured to tag words in text with their respective part of speech—for example, as a noun, verb, article, adjective, preposition, pronoun, adverb, conjunction, or interjection. The data structures of data store 114 and/or data store 150 will be described in further detail later on with reference to detailed drawings and/or flowcharts showing programming algorithms.

Neural Networks

Figure 1C:
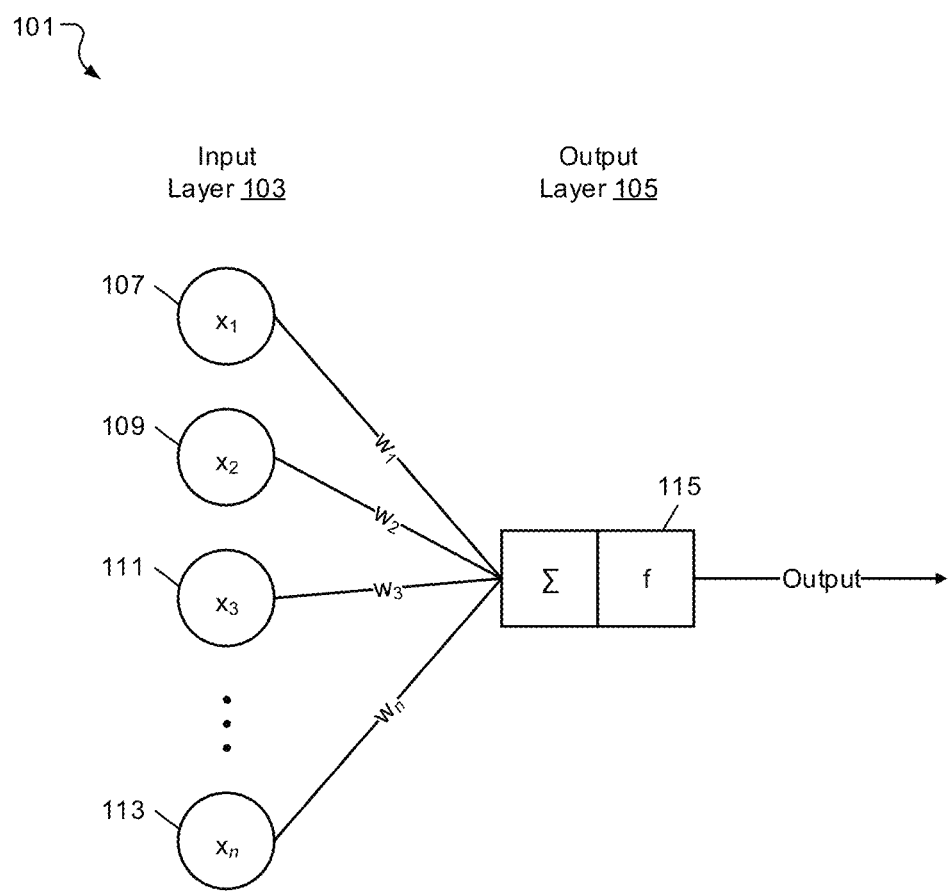
FIG. 1C is a graphical representation of an example neural network with no hidden layers for implementing a machine learning module.

FIG. 1C is a graphical representation of an example neural network with no hidden layers for implementing the machine learning module 128. Generally, neural networks may include an input layer, an output layer, and any number—including none—of hidden layers between the input layer and the output layer. Each layer of the machine learning model may include one or more nodes with each node representing a scalar. Input variables may be provided to the input layer. Any hidden layers and/or the output layer may transform the inputs into output variables, which may then be output from the neural network at the output layer. In various implementations, the input variables to the neural network may be an input vector having dimensions equal to the number of nodes in the input layer. In various implementations, the output variables of the neural network may be an output vector having dimensions equal to the number of nodes in the output layer.

Generally, the number of hidden layers—and the number of nodes in each layer—may be selected based on the complexity of the input data, time complexity requirements, and accuracy requirements. Time complexity may refer to an amount of time required for the neural network to learn a problem—which can be represented by the input variables—and produce acceptable results—which can be represented by the output variables. Accuracy may refer to how close the results represented by the output variables are to real results. In various implementations, increasing the number of hidden layers and/or increasing the number of nodes in each layer may increase the accuracy of neural networks but also increase the time complexity. Conversely, in various implementations, decreasing the number of hidden layers and/or decreasing the number of nodes in each layer may decrease the accuracy of neural networks but also decrease the time complexity.

As shown in FIG. 1C, some examples of neural networks, such as neural network 101, may have no hidden layers. Neural networks with no hidden layers may be suitable for solving problems with input variables that represent linearly separable data. For example, if data can be represented by sets of points existing in a Euclidean plane, then the data may be considered linearly separable if the sets of points can be divided by a single line in the plane. If the data can be represented by sets of points existing in higher-dimensional Euclidean spaces, the data may be considered linearly separable if the sets can be divided by a single plane or hyperplane. Thus, in various implementations, the neural network 101 may function as a linear classifier and may be suitable for performing linearly separable decisions or functions.

As shown in FIG. 1C, the neural network 101 may include an input layer—such as input layer 103, an output layer—such as output layer 105, and no hidden layers. Data may flow forward in the neural network 101 from the input layer 103 to the output layer 105, and the neural network 101 may be referred to as a feedforward neural network. Feedforward neural networks having no hidden layers may be referred to as single-layer perceptrons. In various implementations, the input layer 103 may include one or more nodes, such as nodes 107-113. Although only four nodes are shown in FIG. 1C, the input layer 103 may include any number of nodes, such as n nodes. In various implementations, each node of the input layer 103 may be assigned any numerical value. For example, node 107 may be assigned a scalar represented by $x_1$, node 109 may be assigned a scalar represented by $x_2$, node 111 may be assigned a scalar represented by $x_3$, and node 113 may be assigned a scalar represented by $x_n$.

In various implementations, each of the nodes 107-113 may correspond to an element of the input vector. For example, the input variables to a neural network may be expressed as input vector i having n dimensions. So for neural network 101—which has an input layer 103 with nodes 107-113 assigned scalar values $x_1$-$x_n$, respectively—input vector i may be represented by equation (1) below:

$$i = \langle x_1, x_2, x_3, x_n \rangle. \tag{1}$$

In various implementations, input vector i may be a signed vector, and each element may be a scalar value in a range of between about −1 and about 1. So, in some examples, the ranges of the scalar values of nodes 112-124 may be expressed in interval notation as: $x_1 \in [-1,1]$, $x_2 \in [-1,1]$, $x_3 \in [-1,1]$, and $x_n \in [-1,1]$.

Each of the nodes of a previous layer of a feedforward neural network—such as neural network 101—may be multiplied by a weight before being fed into one or more nodes of a next layer. For example, the nodes of the input layer 103 may be multiplied by weights before being fed into one or more nodes of the output layer 105. In various implementations, the output layer 105 may include one or more nodes, such as node 115. While only a single node is shown in FIG. 1C, the output layer 105 may have any number of nodes. In the example of FIG. 1C, node 107 may be multiplied by a weight $w_1$ before being fed into node 115, node 109 may be multiplied by a weight $w_2$ before being fed into node 115, node 111 may be multiplied by a weight $w_3$ before being fed into node 115, and node 113 may be multiplied by a weight $w_n$ before being fed into node 115. At each node of the next layer, the inputs from the previous layer may be summed, and a bias may be added to the sum before the summation is fed into an activation function. The output of the activation function may be the output of the node.

In various implementations—such as in the example of FIG. 1C, the summation of inputs from the previous layer may be represented by Σ. In various implementations, if a bias is not added to the summed outputs of the previous layer, then the summation Σ may be represented by equation (2) below:

$$\Sigma = x_1 w_1 + x_2 w_2 + x_3 w_3 + x_n w_n. \tag{2}$$

In various implementations, if a bias b is added to the summed outputs of the previous layer, then summation Σ may be represented by equation (3) below:

$$\Sigma = x_1 w_1 + x_2 w_2 + x_3 w_3 + x_n w_n + b. \tag{3}$$

The summation Σ may then be fed into activation function $f$. In various implementations, the activation function $f$ may be any mathematical function suitable for calculating an output of the node. Example activation functions $f$ may include linear or non-linear functions, step functions such as the Heaviside step function, derivative or differential functions, monotonic functions, sigmoid or logistic activation functions, rectified linear unit (ReLU) functions, and/or leaky ReLU functions. The output of the function $f$ may then be the output of the node. In a neural network with no hidden layers—such as the single-layer perceptron shown in FIG. 1C—the output of the nodes in the output layer may be the output variables or output vector of the neural network. In the example of FIG. 1C, the output of node 115 may be represented by equation (4) below if the bias b is not added, or equation (5) below if the bias b is added:

$$\text{Output} = f(x_1 w_1 + x_2 w_2 + x_3 w_3 + x_n w_n), \text{ and} \tag{4}$$

$$\text{Output} = f(x_1 w_1 + x_2 w_2 + x_3 w_3 + x_n w_n + b). \tag{5}$$

Thus, as neural network 101 is illustrated in FIG. 1C with an output layer 105 having only a single node 115, the output vector of neural network 101 is a one-dimensional vector (e.g., a scalar). However, as the output layer 105 may have any number of nodes, the output vector may have any number of dimensions.

Figure 1D:
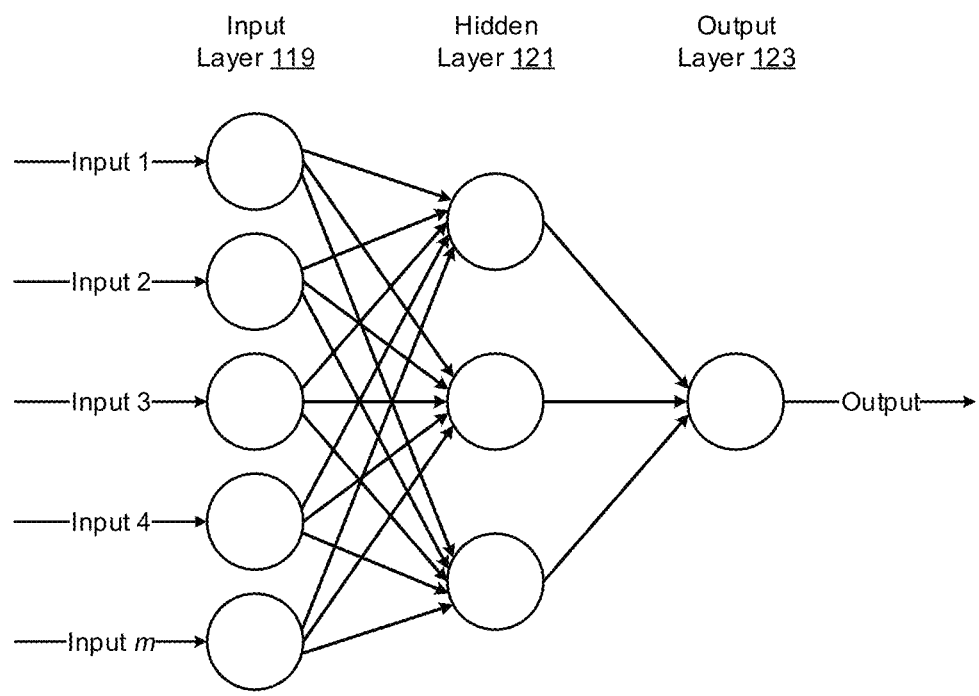
FIG. 1D is a graphical representation of an example neural network with one hidden layer for implementing a machine learning module.

FIG. 1D is a graphical representation of an example neural network with one hidden layer. Neural networks with one hidden layer may be suitable for performing continuous mapping from one finite space to another. Neural networks having two hidden layers may be suitable for approximating any smooth mapping to any level of accuracy. As shown in FIG. 1D, the neural network 117 may include an input layer—such as input layer 119, a hidden layer—such as hidden layer 121, and an output layer—such as output layer 123. In the example of FIG. 1D, each node of a previous layer of neural network 117 may be connected to each node of a next layer. So, for example, each node of the input layer 119 may be connected to each node of the hidden layer 121, and each node of the hidden layer 121 may be connected to each node of the output layer 123. Thus, the neural network shown in FIG. 1D may be referred to as a fully-connected neural network. However, while neural network 117 is shown as a fully-connected neural network, each node of a previous layer does not necessarily need to be connected to each node of a next layer. A feedforward neural network having at least one hidden layer—such as neural network 117—may be referred to as a multilayer perceptron.

In a manner analogous to neural networks described with reference to FIG. 1C, input vectors for neural network 117 may be m-dimensional vectors, where m is a number of nodes in input layer 119. Each element of the input vector may be fed into a corresponding node of the input layer 119. Each node of the input layer 119 may then be assigned a scalar value corresponding to the respective element of the input vector. Each node of the input layer 119 may then feed its assigned scalar value—after it is multiplied by a weight—to one or more nodes of the next layer, such as hidden layer 121. Each node of hidden layer 121 may take a summation of its inputs (e.g., a weighted summation of the nodes of the input layer 119) and feed the summation into an activation function. In various implementations, a bias may be added to the summation before it is fed into the activation function. In various implementations, the output of each node of the hidden layer 121 may be calculated in a manner similar or analogous to that described with respect to the output of node 115 of FIG. 1C.

Each node of the hidden layer 121 may then feed its output—after it is multiplied by a weight—to one or more nodes of the next layer, such as output layer 123. Each node of the output layer 123 may take a summation of its inputs (e.g., a weighted summation of the outputs of the nodes of hidden layer 121) and feed the summation into an activation function. In various implementations, a bias may be added to the summation before it is fed into the activation function. In various implementations, the output of each node of the output layer 123 may be calculated in a manner similar or analogous to that described with respect to the output of node 115 of FIG. 1C. The output of the nodes of the output layer 123 may be the output variables or the output vector of neural network 117. While only a single hidden layer is shown in FIG. 1D, neural network 117 may include any number of hidden layers. A weighted summation of the outputs of each previous hidden layer may be fed into nodes of the next hidden layer, and a weighted summation of the outputs of those nodes may be fed into a further hidden layer. A weighted summation of the outputs of a last hidden layer may be fed into nodes of the output layer.

In various implementations, the neural network used to implement the machine learning module 128 may include a transformer neural network having 12 hidden layers. In various implementations, output variables of the neural network used to implement a model of the machine learning module 128 may be an n-dimensional signed vector that represents a point in n-dimensional space for the text-string input vector. In various implementations, the neural network used to implement a model of the machine learning module 128 may output a 768-dimensional signed vector. In various implementations, the machine learning module 128 may be implemented with a natural language processing (NLP) system using transformer neural networks. In various implementations, the machine learning module 128 may be implemented with a Bidirectional Encoder Representations from Transformers (BERT) technique, and/or an optimized BERT technique such as ROBERTa.

Flowcharts

Score Generation

Figure 2:
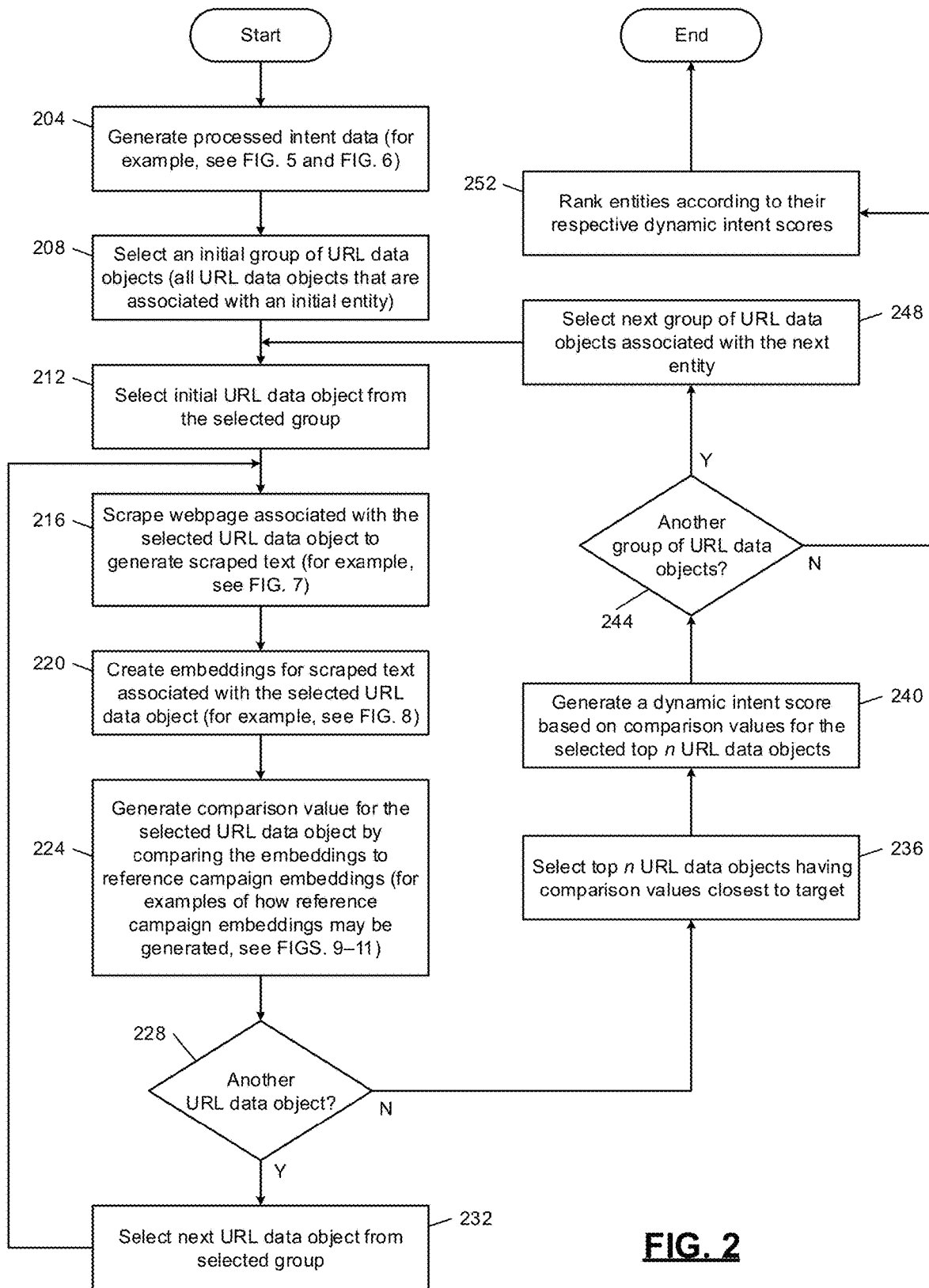
FIG. 2 is a flowchart of an example process for generating dynamic intent score for entities according to their network traffic and ranking entities according to their dynamic intent scores.

FIG. 2 is a flowchart of an example process for generating dynamic intent score for entities according to their network traffic and ranking entities according to their dynamic intent scores. Control begins at 204, where the system 100 generates processed intent data. For example, the network traffic processing module 116, IP address linking module 118, and/or cookie ID linking module 120 may access and parse raw network data 152, raw network data 154, raw network data 156, IP address mapping data 160, and/or cookie ID mapping data 162 to generate processed network data 164. In various implementations, the processed network data 164 includes one or more URL data objects. Each URL data object may include a URL and data identifying an entity that accessed the URL. In various implementations, URL data objects may be categorized by groups. For example, if there are multiple URL data objects associated with a single entity, all of the URL data objects associated with the entity may be categorized into a single group. Additional details of generating processed intent data at 204 will be described further on in this specification with reference to FIGS. 5 and 6. Control proceeds to 208.

At 208, the webpage scraping module 122 and/or the webpage processing module 124 selects an initial group of URL data objects in the processed network data 164, such as all of the URL data objects that are associated with an initial entity. Control proceeds to 212. At 212, the webpage scraping module 122 and/or the webpage processing module 124 selects an initial URL data object from the selected group. Control proceeds to 216. At 216, the webpage scraping module 122 and/or the webpage processing module 124 scrapes the webpage associated with the URL of the selected URL data object and generates scraped text. In various implementations, the scraped text may be stored in the raw webpage data 166 and/or the processed webpage data 168. Additional details of generating scraped text at 216 will be described further on in this specification with reference to FIG. 7. Control proceeds to 220.

At 220, the machine learning module 128 creates embeddings for the scraped text associated with the selected URL data object. In various implementations, the embeddings may be a signed vector saved to embedded network data 174. Additional details of the embedding process at 220 will be described further on in this specification with reference to FIG. 8. Control proceeds to 224. At 224, the signal score generation module 132 generates a comparison value for the selected URL data object by comparing the embeddings for the scraped text associated with the URL data object to the reference campaign embeddings. Example processes of generating reference campaign embeddings will be described further on in this specification with reference to FIGS. 9-11. In various implementations, the reference campaign embeddings may be a signed vector having the same dimensions as the signed vector of the embeddings for the selected URL data object. In various implementations, the comparison value for the selected URL data object may be generated by taking a cosine similarity between the signed vector of the embeddings for the selected URL data object and the signed vector of the reference campaign embeddings. If the embeddings for the selected URL data object are similar to the reference campaign embeddings, then the comparison value will be closer to 1 (in various implementations, computational artifacts, such as those caused by floating point operation rounding, may sometimes cause the comparison value to slightly diverge from 1, such as by less than 1%). If the embeddings are dissimilar, then the comparison value will be closer to 0 or −1 (in various implementations, computational artifacts may sometimes cause the comparison value to slightly diverge from −1, such as by less than 1%). In various implementations, the comparison value may be saved to dynamic score data 178. Control proceeds to 228.

At 228, the webpage scraping module 122, webpage processing module 124, reference data generation module 126, machine learning module 128, and/or dynamic score generation module 130 determine whether another URL data object that has not been processed—for example, by generating a comparison value for the URL data object—is present in the selected group. If at 228 the answer is yes, control proceeds to 232. Otherwise, control proceeds to 236. At 232, the webpage scraping module 122, webpage processing module 124, reference data generation module 126, machine learning module 128, and/or dynamic score generation module 130 selects the next URL data object from the selected group and proceeds back to 216.

At 236, the dynamic score generation module 130 selects the top n URL data objects having comparison values closest to a target. In various implementations, the target may be 1. Control proceeds to 240. At 240, the dynamic score generation module 130 generates a dynamic intent score based on the comparison values for the top n URL data objects of the selected group. In various implementations, the dynamic intent score may be generated by summing the top n comparison values of the selected group. In various implementations, the dynamic intent score may be generated by averaging the top n comparison values of the selected group. The dynamic intent score may be assigned to the entity defining the selected group of URL data objects. In various implementations, the dynamic intent score may be saved to dynamic score data 178. Control proceeds to 244. At 244, the webpage scraping module 122, webpage processing module 124, reference data generation module 126, machine learning module 128, and/or dynamic score generation module 130 determines whether another group of URL data objects that has not been processed—for example, by generating a dynamic intent score for the group—is present in the processed network data 164. If yes, control proceeds to 248. Otherwise, control proceeds to 252.

At 248, the webpage scraping module 122 and/or the webpage processing module 124 selects the next group of URL data objects from the processed network data 164 and proceeds back to 212. At 252, the dynamic score generation module 130 ranks the entities according to their assigned dynamic intent scores. In various implementations, the entities may be ranked from highest to lowest dynamic intent score. In various implementations, the entities may be ranked from lowest to highest dynamic intent score. In various implementations, the dynamic score generation module 130 may generate and output a list of the ranked entities to a graphical user interface.

Market Signal Score

Figure 3:
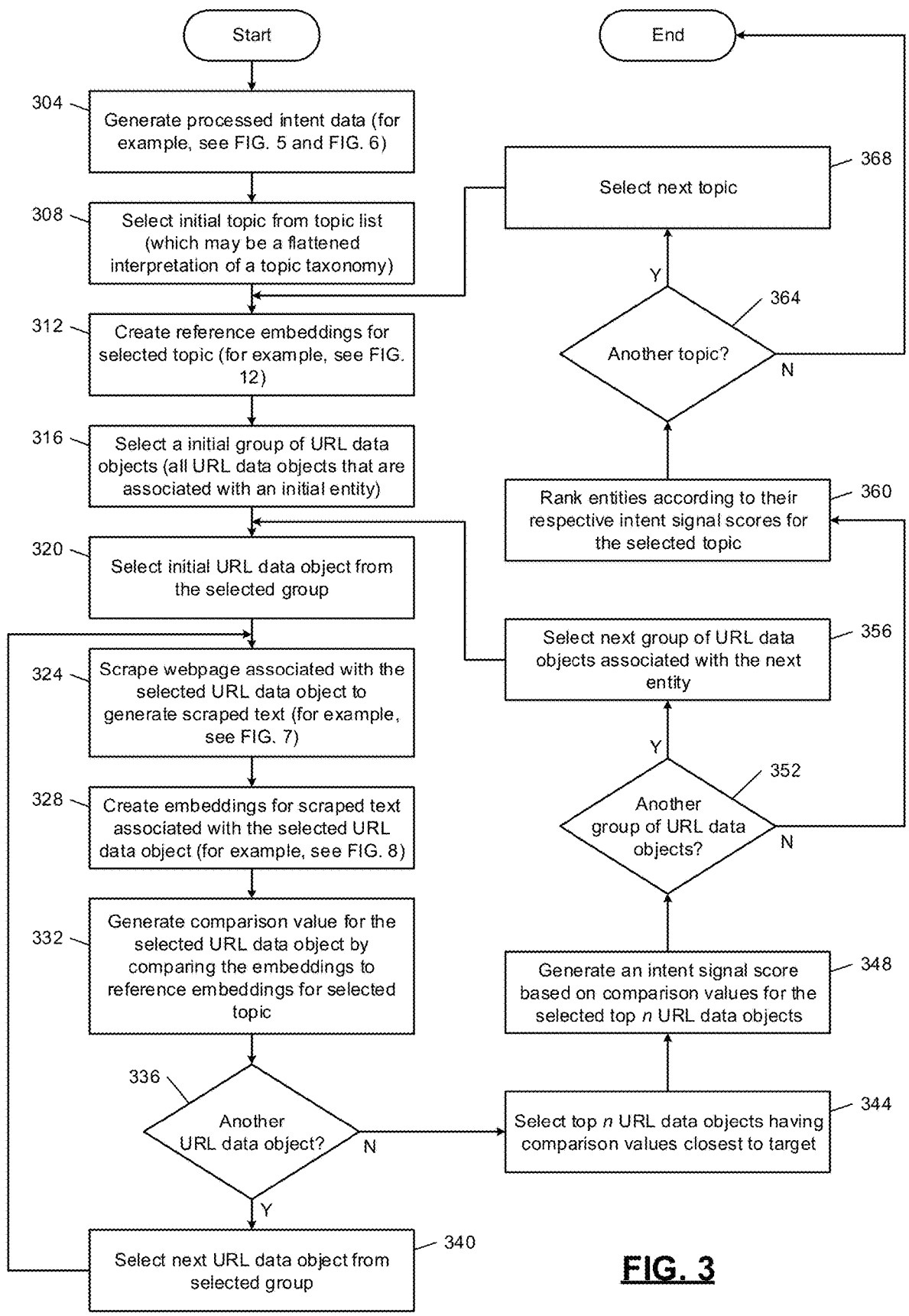
FIG. 3 is a flowchart of an example process for generating intent signal scores for entities according to their network traffic and ranking entities according to their intent signal scores.

FIG. 3 is a flowchart of an example process for generating intent signal scores for entities according to their network traffic and ranking entities according to their intent signal scores. Control begins at 304, where the system 100 generates processed intent data. For example, the network traffic processing module 116, IP address linking module 118, and/or cookie ID linking module 120 may access and parse raw network data 152, raw network data 154, raw network data 156, IP address mapping data 160, and/or cookie ID mapping data 162 to generate processed network data 164. In various implementations, the processed network data 164 includes one or more URL data objects. Each URL data object may include a URL and data identifying an entity that accessed the URL. In various implementations, URL data objects may be categorized by groups. For example, if there are multiple URL data objects associated with a single entity, all of the URL data objects associated with the entity may be categorized into a single group. Additional details of generation processed intent data at 304 will be described further on in this specification with reference to FIGS. 5 and 6. Control proceeds to 308.

At 308, the machine learning module 128 selects an initial topic from a topic list. For example, the machine learning module 128 may select a topic from topic list data 190. In various implementations, the topic list may be a flat file, such as a flattened interpretation of a topic taxonomy. Control proceeds to 312. At 312, the machine learning module 128 may create reference embeddings for the selected topic. In various implementations, the reference embeddings may be a signed vector saved to embedded topic data 176. Additional details of the embedding process at 312 will be described further on in this specification with reference to FIG. 12. Control proceeds to 316. At 316, the webpage scraping module 122 and/or the webpage processing module 124 selects an initial group of URL data objects in the processed network data 164, such as all of the URL data objects that are associated with an initial entity. Control proceeds to 320.

At 320, the webpage scraping module 122 and/or the webpage processing module 124 selects an initial URL data object from the selected group. Control proceeds to 324. At 324, the webpage scraping module 122 and/or the webpage processing module 124 scrapes the webpage associated with the URL of the selected URL data object and generates scraped text. In various implementations, the scraped text may be stored in the raw webpage data 166 and/or the processed webpage data 168. Additional details of generating scraped text at 324 will be described further on in this specification with reference to FIG. 7. Control proceeds to 328.

At 328, the machine learning module 128 creates embeddings for the scraped text associated with the selected URL data object. In various implementations, the embeddings may be a signed vector saved to embedded network data 174. Additional details of the embedding process at 328 will be described further on in this specification with reference to FIG. 8. Control proceeds to 332. At 332, the signal score generation module 132 generates a comparison value for the selected URL data object by comparing the embeddings for the scraped text associated with the URL data object to the reference embeddings for the selected topic. In various implementations, the comparison value for the selected URL data object may be generated by taking a cosine similarity between the signed vector of the embeddings for the selected URL data object and the signed vector of the reference embeddings for the selected topic. If the embeddings for the selected URL data object are similar to the reference embeddings for the selected topic, then the comparison value will be closer to 1. If the embeddings are dissimilar, then the comparison value will be closer to 0 or −1. In various implementations, the comparison value may be saved to signal score data 180. Control proceeds to 336.

At 336, the webpage scraping module 122, webpage processing module 124, reference data generation module 126, machine learning module 128, and/or signal score generation module 132 determines whether another URL data object that has not been processed—for example, by generating a comparison value for the URL data object—is present in the selected group. If at 336 the answer is yes, control proceeds to 340. Otherwise, control proceeds to 344. At 340, the webpage scraping module 122, webpage processing module 124, reference data generation module 126, machine learning module 128, and/or signal score generation module 132 selects the next URL data object from the selected group and proceeds back to 324.

At 344, the signal score generation module 132 selects the top n URL data objects having comparison values closest to the target. In various implementations, the target may be 1. Control proceeds to 348. At 348, the signal score generation module 132 generates an intent signal score based on the comparison values for the top n URL data objects of the selected group. In various implementations, the intent signal score may be generated by summing the top n comparison vectors of the selected group. In various implementations, the intent signal score may be generated by averaging the top n URL data objects of the selected group. The intent signal score may be assigned to the entity defining the selected group of URL data objects. In various implementations, the intent signal score may be saved to signal score data 180. Control proceeds to 352.

At 352, the webpage scraping module 122, webpage processing module 124, reference data generation module 126, machine learning module 128, and/or signal score generation module 132 determines whether another group of URL data objects that has not been processed—for example, by generating an intent signal score for the group—is present in the processed network data 164. If yes, control proceeds to 356. Otherwise, control proceeds to 360. At 356, the webpage scraping module 122 and/or the webpage processing module 124 selects the next group of URL data objects from the processed network data 164 and proceeds back to 320. At 360, the signal score generation module 132 ranks the entities according to their assigned intent signal scores for the selected topic. In various implementations, the entities may be ranked from highest to lowest intent signal score for the selected topic. In various implementations, the entities may be ranked from lowest to highest intent signal score for the selected topic. In various implementations, the signal score generation module 132 may generate and output a list of the ranked entities along with the selected topic to the graphical user interface. Control proceeds to 364.

At 364, the machine learning module 128 and/or the signal score generation module 132 may determine whether another topic that has not been processed—for example, by generating intent signal scores for entities according to the topic—is present in the topic list data 190. If yes, control proceeds to 368. Otherwise, control ends. At 368, the machine learning module 128 selects the next topic from the topic list data 190 and proceeds back to 312.

Account Stage Score

Figure 4:
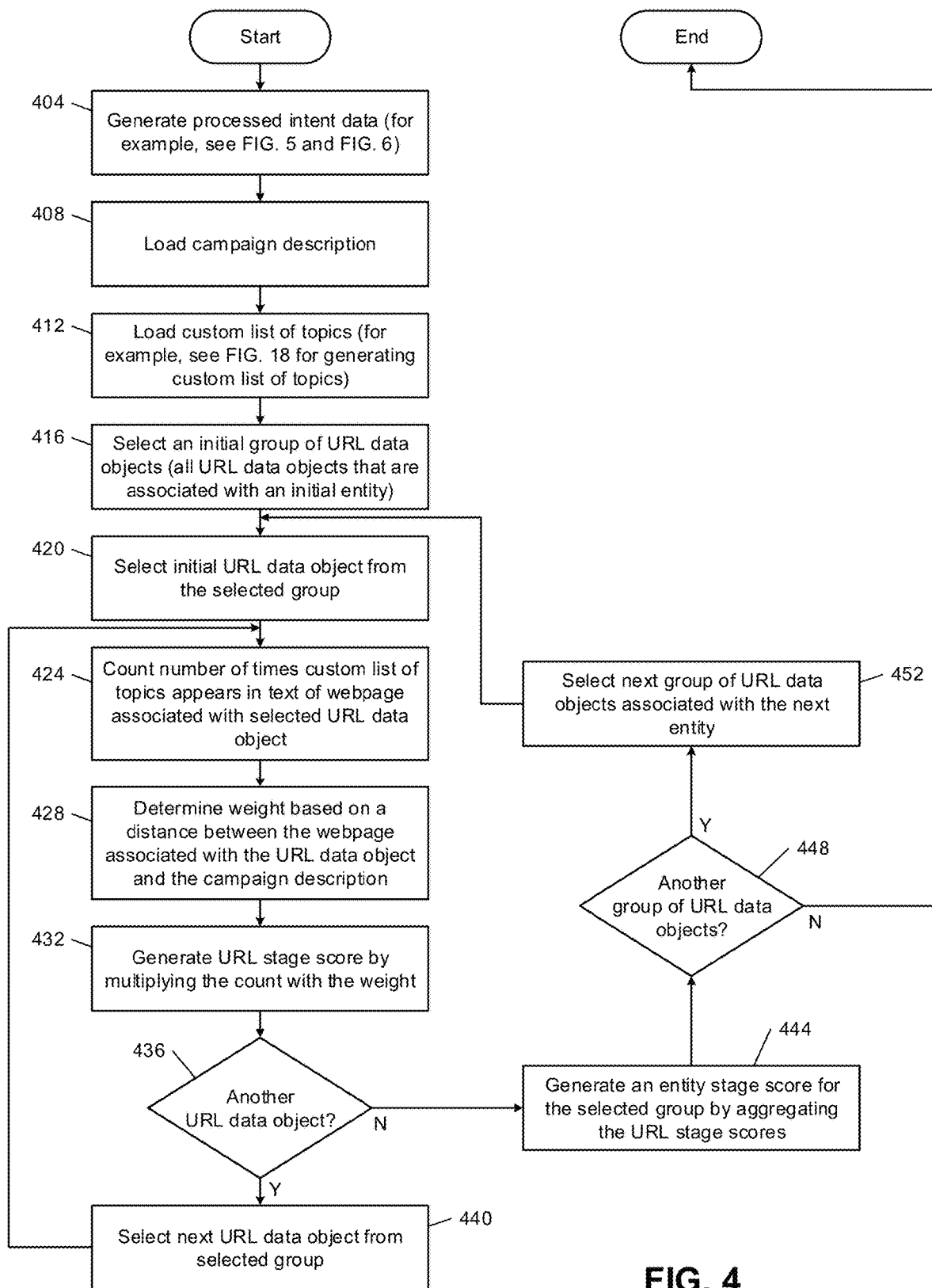
FIG. 4 is a flowchart of an example process for generating stage scores for entities according to their network traffic.

FIG. 4 is a flowchart of an example process for generating stage scores for entities according to their network traffic. Control begins at 404, where the system 100 generates processed intent data. For example, the network traffic processing module 116, IP address linking module 118, and/or cookie ID linking module 120 may access and parse raw network data 152, raw network data 154, raw network data 156, IP address mapping data 160, and/or cookie ID mapping data 162 to generate processed network data 164. In various implementations, the processed network data 164 includes one or more URL data objects. Each URL data object may include a URL and data identifying an entity that accessed the URL. In various implementations, URL data objects may be categorized by groups. For example, if there are multiple URL data objects associated with a single entity, all of the URL data objects associated with the entity may be categorized into a single group. Additional details of generating processed intent data at 404 will be described further on in this specification with reference to FIGS. 5 and 6. Control proceeds to 408.

At 408, the stage score generation module 140 loads a campaign description. In various implementations, the campaign description may include one or more text strings related to a marketing campaign. In various implementations, the stage score generation module 140 may load the campaign description from the data store 114. Control proceeds to 412. At 412, the stage score generation module 140 loads a custom list of topics. In various implementations, the custom list of topics may include one or more text strings corresponding to one or more topics. In various implementations, the stage score generation module 140 may load the custom list of topics from topic list data 190. Control proceeds to 416. At 416, the stage score generation module 140 selects an initial group of URL data objects in the processed network data 164, such as all of the URL data objects that are associated with an initial entity. Control proceeds to 420. At 420, the stage score generation module 140 selects an initial URL data object from the selected group. Control proceeds to 424.

At 424, the stage score generation module 140 counts a number of times topics from the custom list of topics appear in extracted text of the webpage associated with the selected URL data object and saves the number as a count. In various implementations, the custom list of topics may be generated according to the process described below with reference to FIG. 18. In various implementations, the stage score generation module 140 may call on the webpage scraping module 122 to extract text from the webpage the URL of the URL data object points to. The stage score generation module 140 may then parse the extracted text and determine the number of times topics from the custom list of topics appear in the extracted text. Control proceeds to 428. At 428, the stage score generation module 140 determines a weight based on a distance between the webpage associated with the URL data object and the campaign description. Control proceeds to 432. At 432, the stage score generation module 140 generates a URL stage score. In various implementations, the URL stage score may be generated for the selected URL data object by multiplying the count determined at 424 with the weight determined at 428. Control proceeds to 436.

At 436, the stage score generation module 140 determines whether another URL data object that has not been processed—for example, by generating a URL stage score for the URL data object—is present in the processed network data 164. If yes, control proceeds to 440. Otherwise, control proceeds to 444. At 440, the stage score generation module 140 selects the next URL data object from the selected group and proceeds back to 424. At 444, the stage score generation module 140 generates an entity stage score for the entity associated with the selected group by aggregating the URL stage scores for URL data objects of the selected group. Control proceeds to 448. At 448, the stage score generation module 140 determines whether another group of URL data objects that has not been processed—for example, by generating a dynamic intent score for the group—is present in the processed network data 164. If yes, control proceeds to 452. Otherwise, control ends.

IP-Address-Based Intent Data

Figure 5:
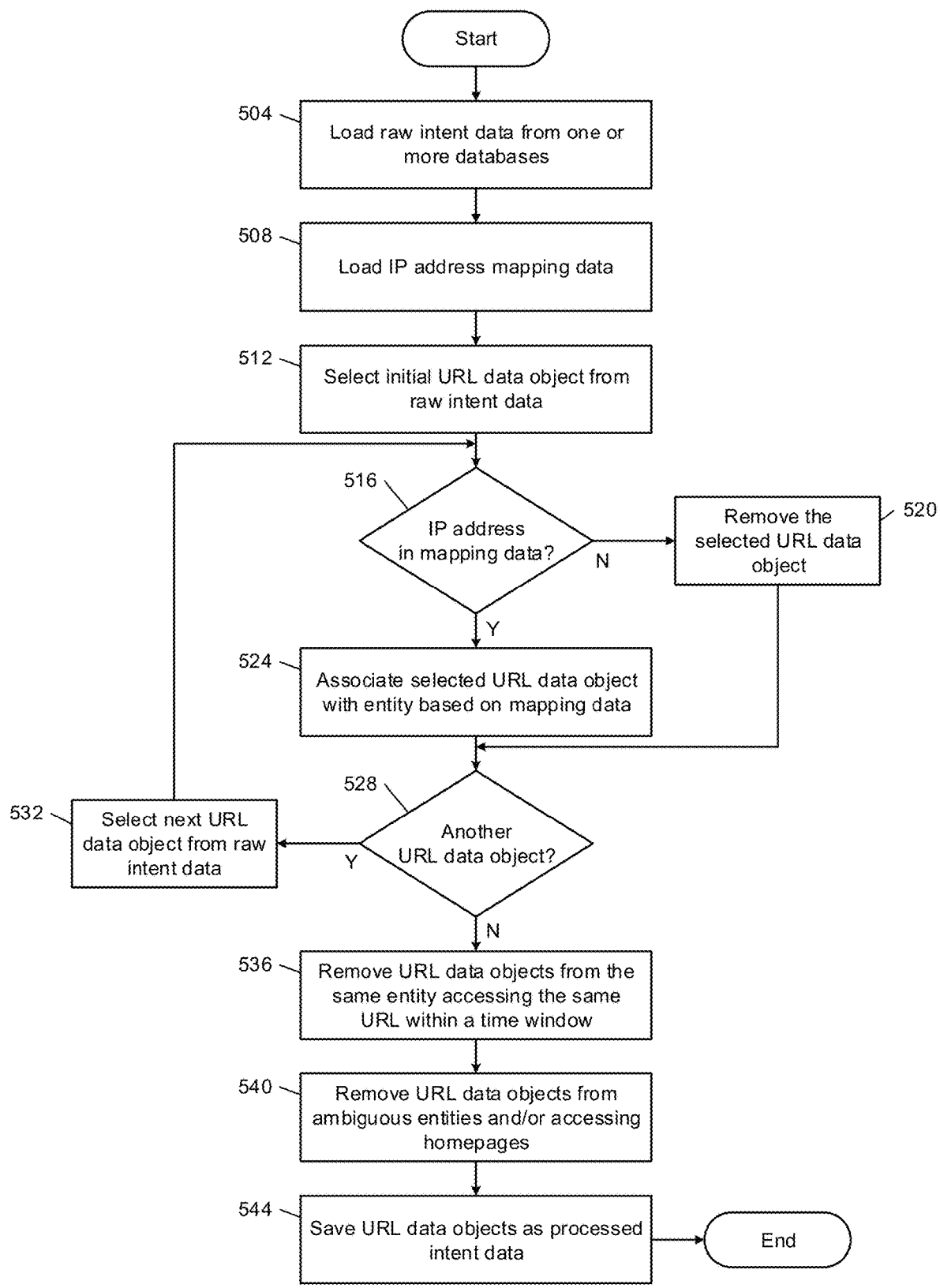
FIG. 5 is a flowchart of an example process for generating processed intent data based on network traffic.

FIG. 5 is a flowchart of an example process for generating processed intent data based on network traffic. Control begins at 504, where the network traffic processing module 116 loads raw intent data from one or more databases. For example, the network traffic processing module 116 may access data store 150 via shared system resources 110, communications interface 108, communications system 106, communications interface 142, shared system resources 144, and/or application programming interface 148. Network traffic processing module 116 may load raw network data 152, raw network data 154, and/or raw network data 156 from data store 150. In various implementations, network traffic processing module 116 may pass the loaded raw network data 152, raw network data 154, and/or raw network data 156 to the IP address linking module 118. Control proceeds to 508.

At 508, the IP address linking module 118 loads IP address mapping data, such as IP address mapping data 160. Control proceeds to 512. At 512, the IP address linking module 118 accesses the raw intent data—such as raw network data 152, raw network data 154, and/or raw network data 156—and selects an initial URL data object from the raw intent data. Each URL data object may be a row of the raw intent data. Control proceeds to 516. At 516, the IP address linking module 118 determines whether the IP address in the selected URL data object is present in the IP address mapping data. If the IP address is not present, control proceeds to 520. If the IP address is present, control proceeds to 524. At 520, the IP address linking module 118 removes the selected URL data object from the raw intent data and control proceeds to 528.

At 524, the IP address linking module 118 associates the selected URL data object with an entity based on the IP address mapping data. For example, the IP address mapping data may show that the IP address of the selected URL data object is associated with an entity. The IP address linking module 118 can then associate the selected URL data object with the entity and add the URL data object to an intermediate data structure. Control proceeds to 528. At 528, the IP address linking module 118 determines whether another URL data object is present in the loaded raw intent data. If the answer is yes, control proceeds to 532. Otherwise, control proceeds to 536. At 532, the IP address linking module 118 selects the next URL data object from the raw intent data and control proceeds back to 516. At 536, the IP address linking module 118 removes URL data objects from the same entity accessing the same URL within a time window. For example, the IP address linking module 118 may access the intermediate data structure and remove URL data objects from the same entity that accessed the same URL within a time window. In various implementations, the time window may include any range of time up to about ten minutes. Control proceeds to 540.

At 540, the IP address linking module 118 may remove URL data objects from ambiguous entities and/or accessing homepages. For example, the IP address linking module 118 may access the intermediate data structure and remove URL data objects associated with Internet service providers (ISPs), virtual private networks (VPNs), and/or remove URL data objects with URLs pointing to some homepages—such as URLs ending in a top-level domain, a top-level domain followed by a forward slash, "index.htm," "index.htm" followed by a forward slash, "index.html," and/or "index.html" followed by a forward slash. In various implementations, the IP address linking module 118 may remove URL data objects associated with homepages by taking the x most common URLs, sorting the URLs by the length of the portion of the URL following the top level domain (e.g., "sports" in https://www.homepage.com/sports has a length of six), and removing URL data objects appearing near the top of the list. Control proceeds to 544. At 544, the IP address linking module 118 saves the URL data objects as processed intent data. For example, the IP address linking module 118 saves the intermediate data structure as processed intent data in processed network data 164.

Cookie-Based Intent Data

Figure 6:
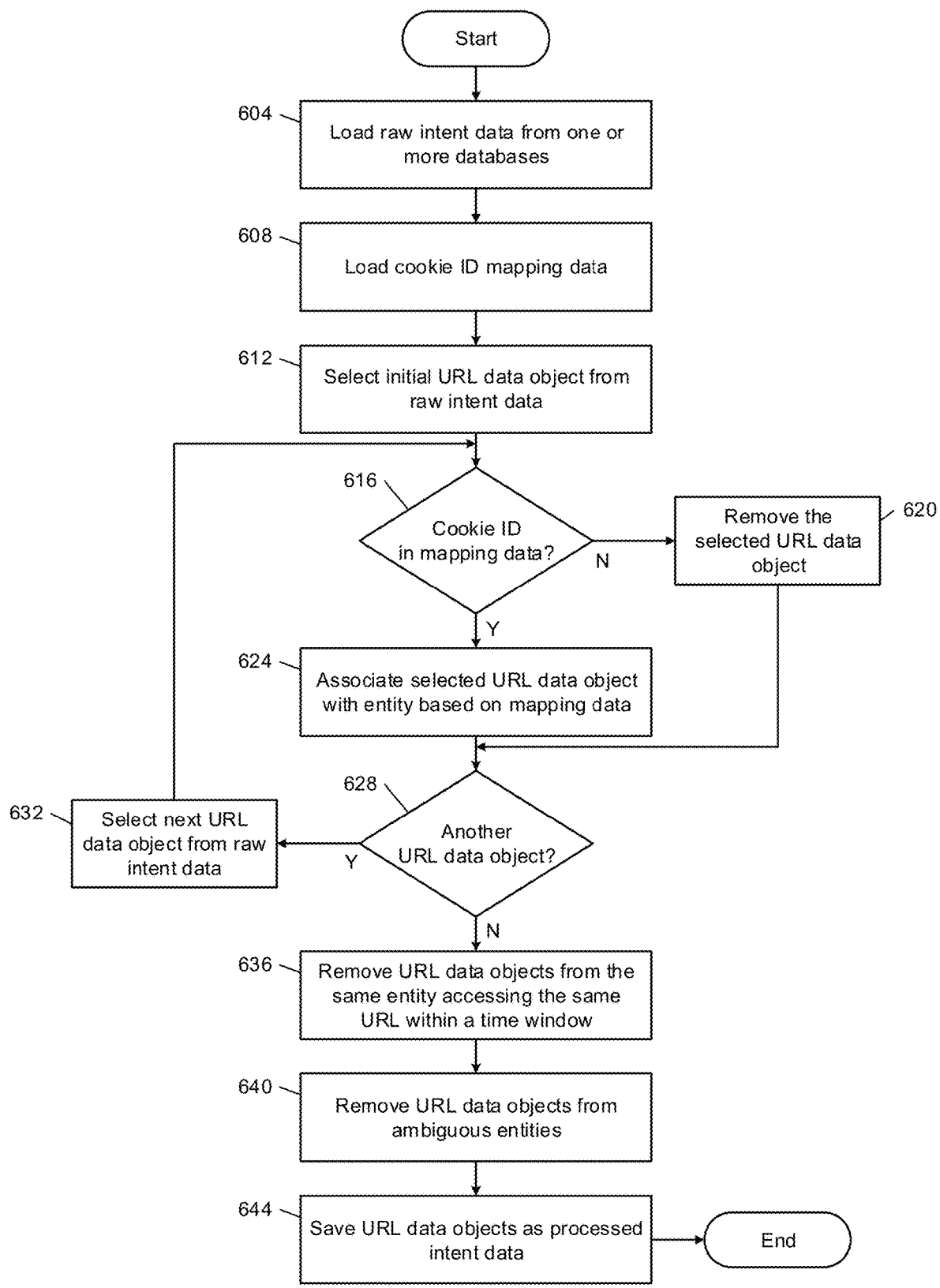
FIG. 6 is a flowchart of an example process for generating processed intent data based on network traffic.

FIG. 6 is a flowchart of an example process for generating processed intent data based on network traffic. Control begins at 604, where the network traffic processing module 116 loads raw intent data from one or more databases. For example, the network traffic processing module 116 may access data store 150 via shared system resources 110, communications interface 108, communications system 106, communications interface 142, shared system resources 144, and/or application programming interface 148. Network traffic processing module 116 may load raw network data 152, raw network data 154, and/or raw network data 156 from data store 150. In various implementations, network traffic processing module 116 may pass the loaded raw network data 152, raw network data 154, and/or raw network data 156 to the cookie ID linking module 120. Control proceeds to 608.

At 508, the cookie ID linking module 120 loads cookie ID mapping data, such as cookie ID mapping data 162. Control proceeds to 612. At 612, the cookie ID linking module 120 accesses the raw intent data—such as raw network data 152, raw network data 154, and/or raw network data 156—and selects an initial URL data object from the raw intent data. Each URL data object may be a row of the raw intent data. Control proceeds to 616. At 616, cookie ID linking module 120 determines whether the cookie ID in the selected URL data object is present in the cookie ID mapping data. If the cookie ID is not present, control proceeds to 620. If the cookie ID is present, control proceeds to 624. At 620, the cookie ID linking module 120 removes the selected URL data object from the raw intent data and control proceeds to 628.

At 624, the cookie ID linking module 120 associates the selected URL data object with an entity based on the cookie ID mapping data. For example, the cookie ID mapping data may show that the cookie ID of the selected URL data object is associated with an entity. The cookie ID linking module 120 can then associate the selected URL data object with the entity and add the URL data object to an intermediate data structure. Control proceeds to 628. At 628, the cookie ID linking module 120 determines whether another URL data object is present in the loaded raw intent data. If the answer is yes, control proceeds to 632. Otherwise, control proceeds to 636. At 632, the cookie ID linking module 120 selects the next URL data object from the raw intent data and control proceeds back to 616. At 636, the cookie ID linking module 120 removes URL data objects from the same entity accessing the same URL within a time window. For example, the cookie ID linking module 120 may access the intermediate data structure and remove URL data objects from the same entity that accessed the same URL within a time window. In various implementations, the time window may include any range of time up to about ten minutes. Control proceeds to 640.

At 640, the cookie ID linking module 120 may remove URL data objects from ambiguous entities and/or with URLs pointing to homepages. For example, the cookie ID linking module 120 may access the intermediate data structure and remove URL data objects associated with Internet service providers (ISPs), virtual private networks (VPNs), and/or remove URL data objects with URLs pointing to some homepages-such as URLs ending in a top-level domain, a top-level domain followed by a forward slash, "index.htm," "index.htm" followed by a forward slash, "index.html," and/or "index.html" followed by a forward slash. Control proceeds to 644. At 644, the cookie ID linking module 120 saves the URL data objects as processed intent data. For example, the cookie ID linking module 120 may save the intermediate data structure as processed intent data in processed network data 164.

Webpage Scraping

Figure 7:
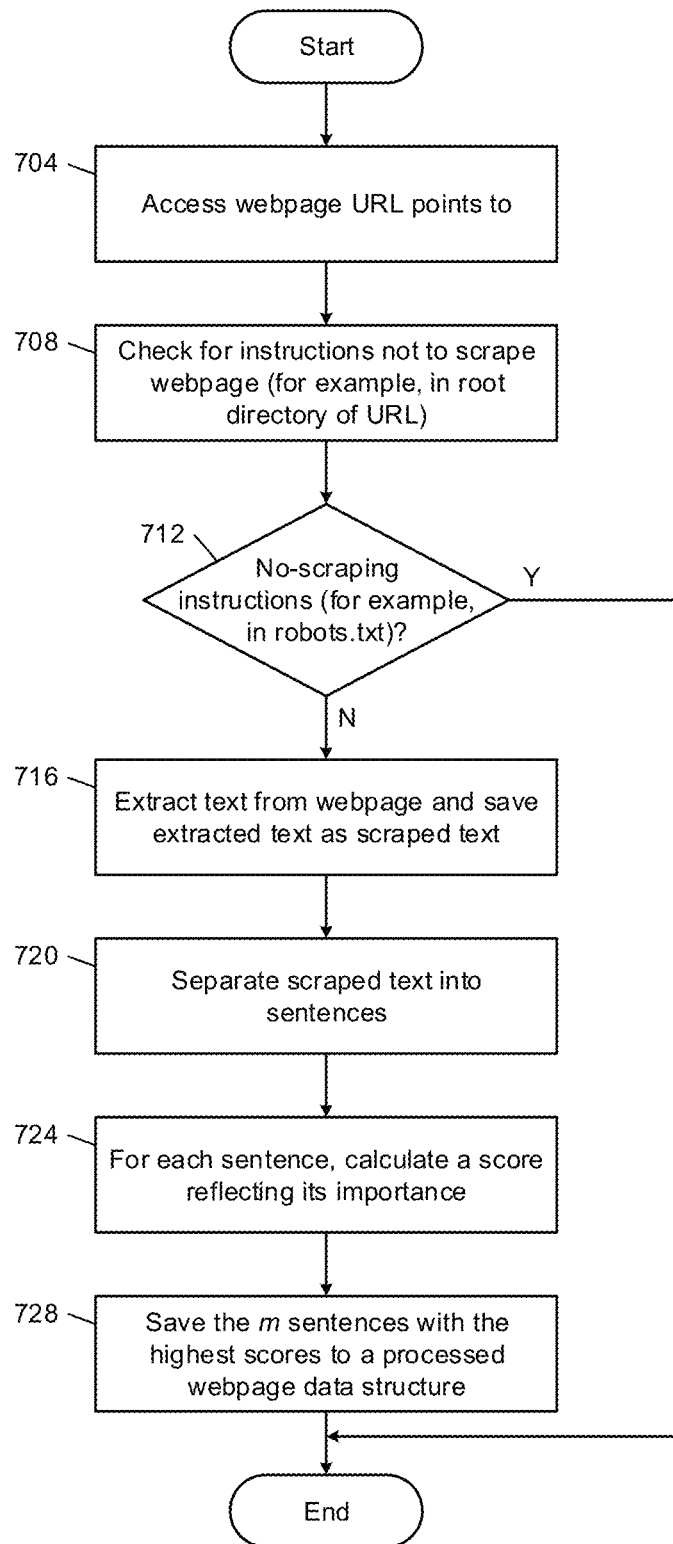
FIG. 7 is flowchart of an example process for scraping a webpage and preparing the scraped text for use as input variables for a machine learning model.

FIG. 7 is flowchart of an example process for scraping a webpage and preparing the scraped text for use as input variables for a machine learning model. Control begins at 704. At 704, the webpage scraping module 122 accesses the webpage a specified URL points to. Control proceeds to 708. At 708, the webpage scraping module 122 checks the website for instructions not to scrape the webpage. For example, the webpage scraping module 122 may check the root directory of the URL for no-scraping instructions, such as no-scraping instructions present in a "robots.txt" file. Control proceeds to 712. At 712, the webpage scraping module 122 determines whether no-scraping instructions are present. If yes, control ends. Otherwise, control proceeds to 716. At 716, the webpage scraping module 122 extracts text from the webpage and saves the extracted text as scraped text. In various implementations, the webpage scraping module 122 may save the scraped text to raw webpage data 166. Control proceeds to 720.

At 720, the webpage processing module 124 separates the scraped text into sentences. Control proceeds to 724. At 724, the webpage processing module 124 calculates—for each sentence—a score reflecting the importance of the sentence. In various implementations, the score may be calculated according to any of the algorithms described below in table 1:

TABLE 1

| Algorithm | Description |
| --- | --- |
| word frequency | Words are assigned higher scores if they appear more frequently in the text. Sentences containing words having higher scores are assigned higher sentence scores. |
| TF/IDF | Sentences containing "more specific words" are assigned higher scores. Target "more specific words" may be nouns. |
| upper case | Words having one or more upper case letters are assigned higher scores. Sentences having words with higher scores are assigned higher sentence scores. |
| proper noun | Sentences having proper nouns are assigned higher scores. |
| word co-occurrence | Sentences having more co-occurrence words are scored higher. Word co-occurrence may refer to two terms appearing alongside in a certain order. |
| lexical similarity | Sentences having strong chains—such as words having similar meanings or some other semantic relation—are scored higher. |
| cue-phrases | Sentences starting with cue-phrases such as "in summary" or "in conclusion," or including emphasis phrases such as "according to the study" or significantly" are assigned higher scores. |
| sentence inclusion of numerical data | Sentences including numerical data are assigned higher scores. |
| sentence length | Longer sentences are assigned higher scores. |
| sentence position | Earlier sentences in paragraphs are assigned higher scores. |
| sentence centrality | Sentences having overlapping vocabulary with other sentences are assigned higher scores |
| sentence resemblance to title | Sentences having overlapping vocabulary with the title of the document are assigned higher scores. |
| graph scoring | Sentences referring to another are scored higher. |
| text rank | Important keywords from are extracted from text. Sentences having more keywords are scored higher. |
| bushy path of the node | Sentences may be mapped as nodes. Sentences are scored based on the number of links connecting them to other nodes. |
| aggregate similarity | Sentences may be mapped as nodes connected by links. Sentences are scored based on a sum of the weights (e.g., similarities) on the links. |

Control proceeds to 728. At 728, the webpage processing module 124 saves the m sentences with the highest scores to a processed webpage data structure, such as processed webpage data 168. In various implementations, m may be five.

Campaign Data Generation

Figure 8:
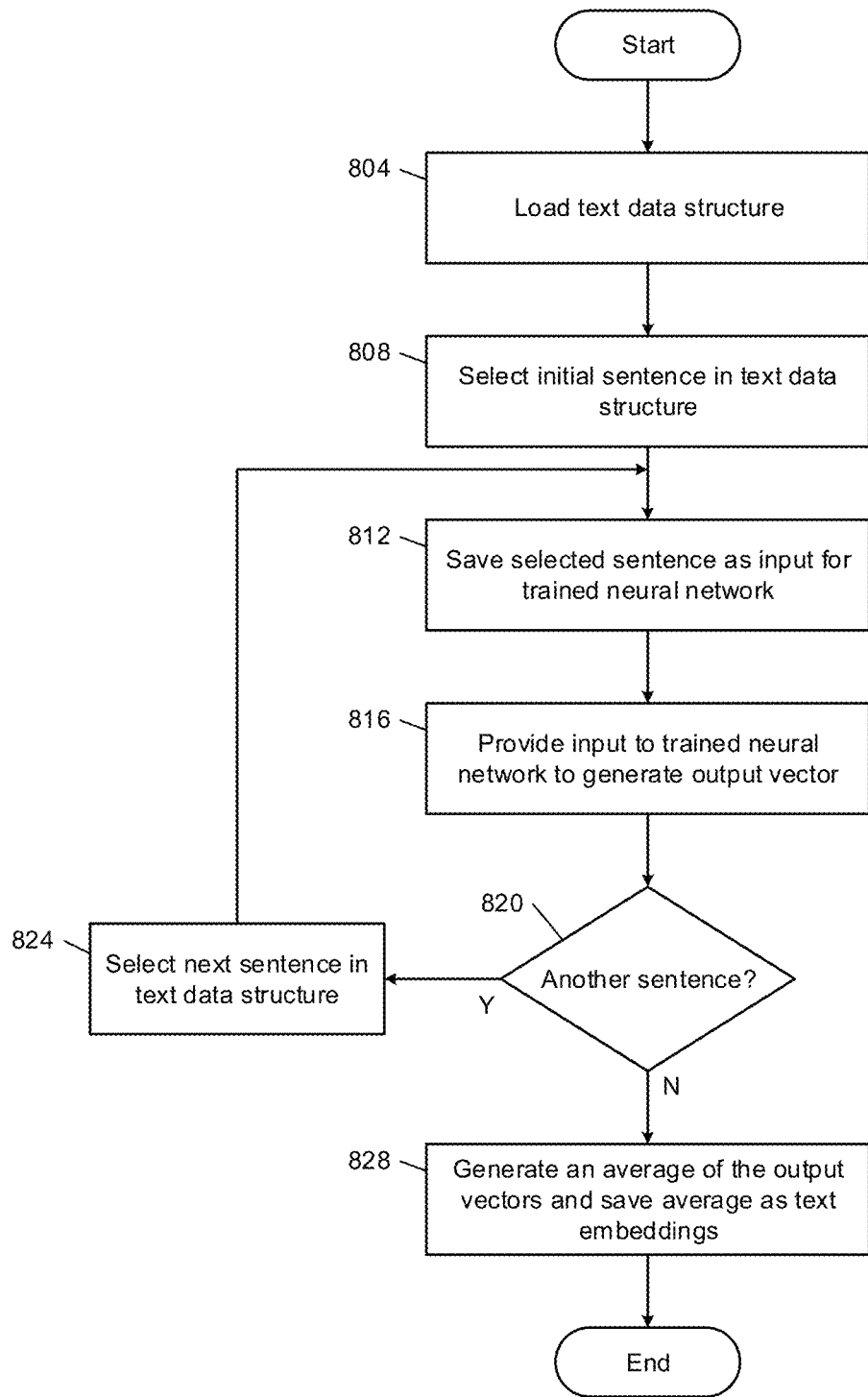
FIG. 8 is a flowchart of an example process for embedding text. Control begins at 804.

FIG. 8 is a flowchart of an example process for embedding text. Control begins at 804. At 804, the machine learning module 128 loads a text data structure, such as processed webpage data 168. Control proceeds to 808. At 808, the machine learning module 128 selects an initial sentence in the text data structure. Control proceeds to 812. At 812, the machine learning module 128 saves the selected sentence as input variables for a training neural network. In various implementations, the machine learning module 128 transforms the selected sentence into a vector suitable for use as input variables the trained neural network used to implement the machine learning module 128. Control proceeds to 816. At 816, the machine learning module 128 provides the input vector to the trained neural network to generate an output vector. Control proceeds to 820.

At 820, the machine learning module 128 determines whether another sentence is present in the loaded text data structure. If the answer is yes, control proceeds to 824. Otherwise, control proceeds to 828. At 824, the machine learning module 128 selects the next sentence in the loaded text data structure and proceeds back to 812. At 828, the machine learning module 128 generates an average of the output vectors for each of the sentences of the loaded text data structure and saves an average as text embeddings.

Campaign Data Embedding

Figure 9:
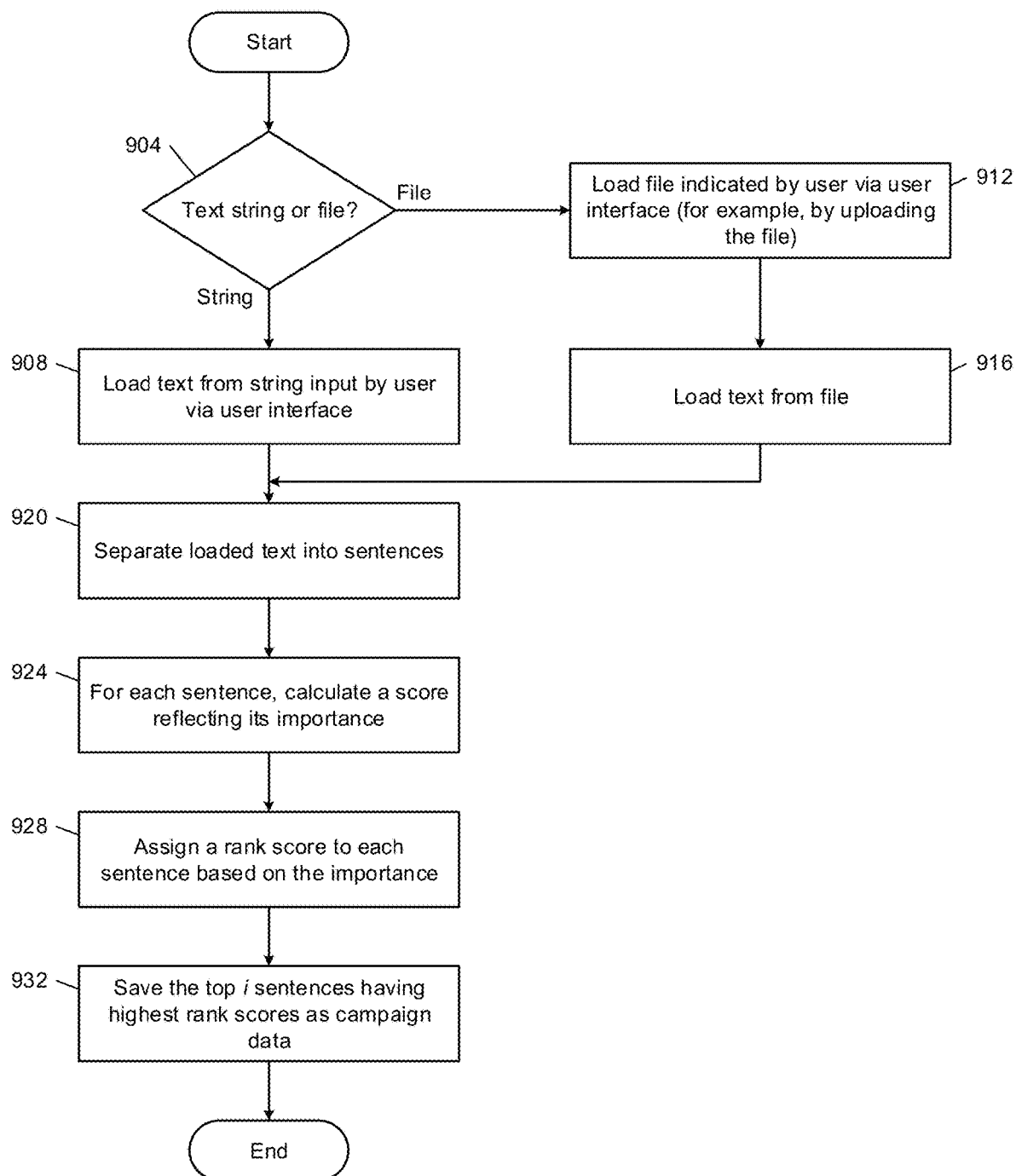
FIG. 9 is a flowchart of an example process for generating campaign data.

FIG. 9 is a flowchart of an example process for generating campaign data. Control begins at 904. At 904, the reference data generation module 126 determines whether a text string or a file has been input or uploaded by a user at the user interface. If at 904 a string is input, control proceeds to 908. If at 904 a file is uploaded, control proceeds to 912. At 908, the reference data generation module 126 loads text from the string input by the user. Control proceeds to 920. At 912, the reference data generation module 126 loads the file indicated by the user via the user interface. For example, the user can upload the file. Control proceeds to 916. At 916, the reference data generation module 126 loads text from the file. In various implementations, the reference data generation module 126 may parse the file and extract the text. In various implementations, the reference data generation module 126 may perform optical character recognition (OCR) on the file and extract the text. Control proceeds to 920.

At 920, the reference data generation module 126 separates the loaded text into sentences. Control proceeds to 924. At 924, the reference data generation module 126 calculates, for each sentence, a score reflecting the importance of the sentence. Control proceeds to 928. At 928, the reference data generation module 126 assigns a rank score to each sentence based on the calculated importance of each sentence. Control proceeds to 932. At 932, the reference data generation module 126 saves the top i sentences having highest rank scores as campaign data. In various implementations, i may be five. In various implementations, the reference data generation module 126 saves the top i sentences to raw reference data 170.

Figure 10:
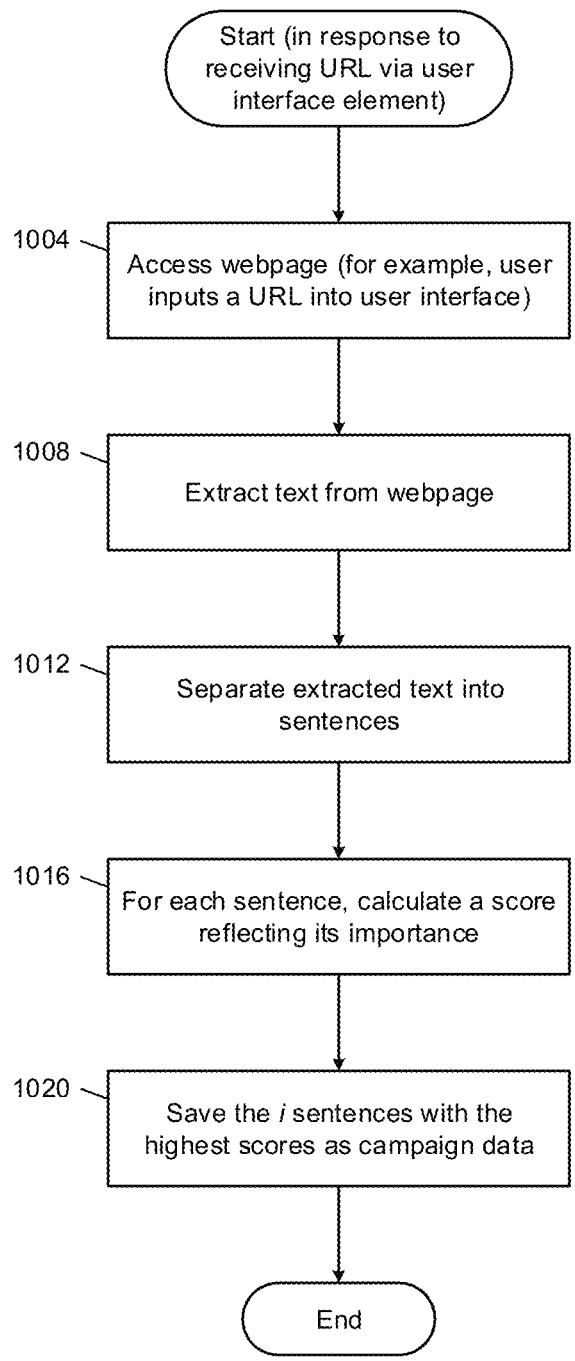
FIG. 10 is a flowchart of an example process for generating campaign data.

FIG. 10 is a flowchart of an example process for generating campaign data. Control begins at 1004. At 1004, the reference data generation module 126 calls on the webpage scraping module 122 to access a webpage. In various implementations, the webpage could be pointed to by a URL input by the user on the user interface. Control proceeds to 1008. At 1008, the reference data generation module 126 calls on the webpage scraping module 122 to extract text from the webpage. Control proceeds to 1012. At 1012, the reference data generation module 126 calls on the webpage scraping module 122 and/or the webpage processing module 124 to separate the extracted text into sentences. Control proceeds to 1016. At 1016, the reference data generation module 126 calculates, for each sentence, a score reflecting the importance of the sentence. Control proceeds to 1020. At 1020, the reference data generation module 126 saves the top i sentences as campaign data. In various implementations, i may be five. In various implementations, the reference data generation module 126 saves the top i sentences to raw reference data 170.

Figure 11:
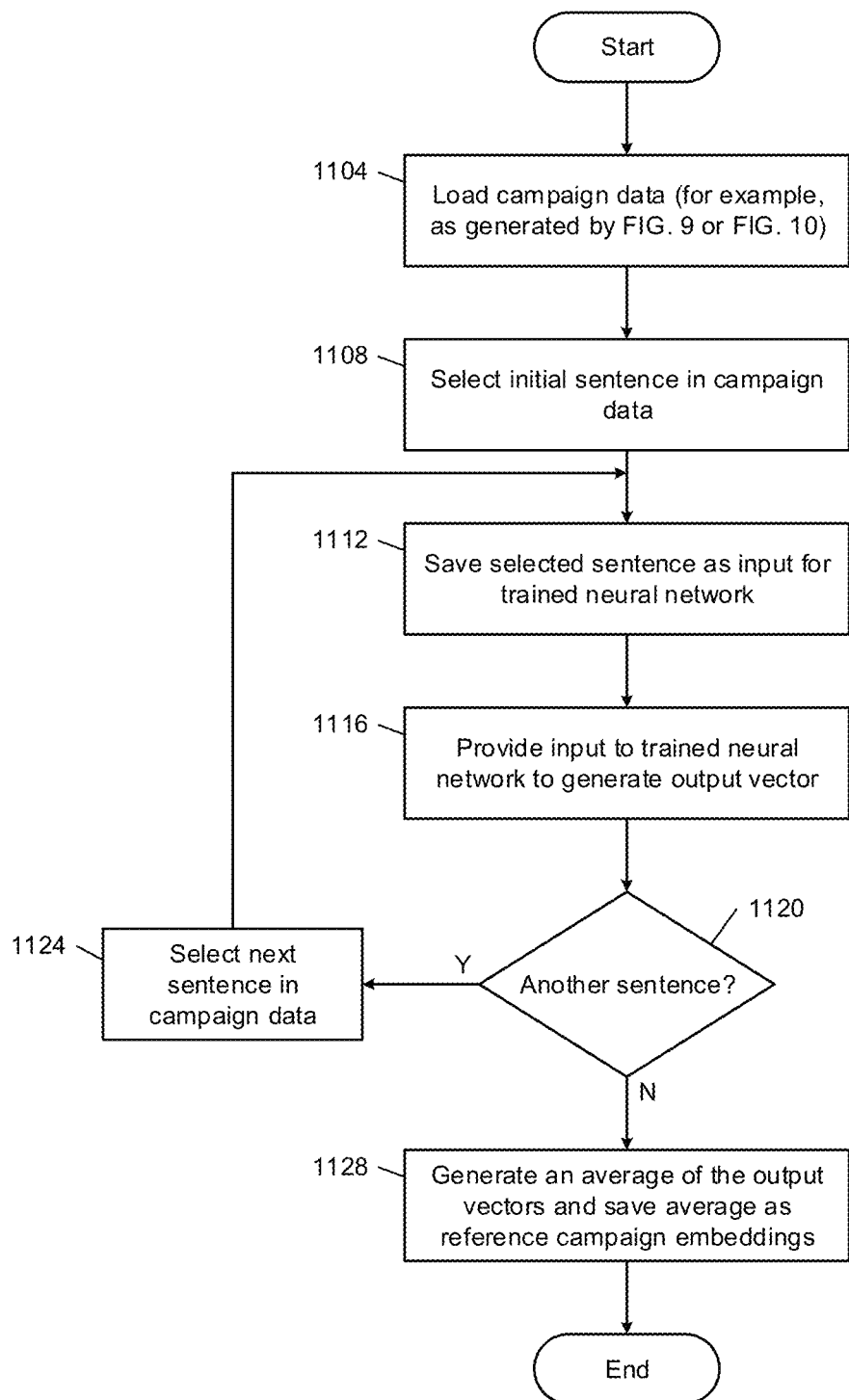
FIG. 11 is a flowchart of an example process for embedding campaign data.

FIG. 11 is a flowchart of an example process for embedding campaign data. Control begins at 1104. At 1104, the machine learning module 128 loads campaign data. For example, the machine learning module 128 may load the i sentences saved by the reference data generation module 126 to raw reference data 170. Control proceeds to 1108. At 1108, the machine learning module 128 selects the initial sentence in the campaign data. Control proceeds to 1112. At 1112, the machine learning module 128 saves the selected sentence as inputs for the trained machine learning module used to implement the machine learning module 128. For example, the machine learning module 128 may transform the selected sentence into an input vector suitable for the trained machine learning model. Control proceeds to 1116.

At 1116, the machine learning module 128 provides the input vector to the trained machine learning model—such as one of the trained neural networks previously described in this specification. The trained machine learning model generates an output vector based on the input vector. Control proceeds to 1120. At 1120, the machine learning module 128 determines whether another unprocessed sentence is present in the campaign data. If the answer is yes, control proceeds to 1124. Otherwise, control proceeds to 1128. At 1124, the machine learning module 128 selects the next sentence in the campaign data and proceeds back to 1112. At 1128, the machine learning module 128 generates an average of the output vector for each sentence of the topic data and saves Control proceeds to 1216. At 1216, the machine learning module 128 assigns a rank score to each sentence based on the importance of the sentence. Control proceeds to 1220. At 1220, the machine learning module 128 saves the top j sentences having highest rank scores as topic data. In various implementations, j may be five. Control proceeds to 1224.

At 1224, the machine learning module 128 selects an initial sentence in the topic data. Control proceeds to 1228. At 1228, the machine learning module 128 saves the selected sentence as inputs for the trained neural network used to implement the machine learning module 128. For example, the machine learning module 128 may transform the selected sentence into an input vector for the trained machine learning model. In various implementations, the selected sentence may be transformed into the input vector by first tokenizing the sentences, then vectorizing the tokenized text. Tokenization divides the sentence into smaller units, such as individual words or terms. The smaller units may then be vectorized—or transformed into numerical vectors. For example, a unique numerical value may be assigned to each unique smaller unit. In various implementations, the machine learning module 128 may tokenize text according to any of the algorithms in table 2 below:

TABLE 2

| Algorithm | Description |
| --- | --- |
| space and punctuation tokenization | The text of a sentence is divided by spaces. |
| rule-based tokenization | Special words are first transformed according to rules—for example, "don't" may be split into "do" and "n't"—before the sentence is tokenized according to space and punctuation tokenization. |
| character-level tokenization | Sentences are split based on context-independent representations for individual characters. |
| subword tokenization | Frequently used words are not split into subwords, but rare words are decomposed. |
| Byte-Pair Encoding (BPE) | A pre-tokenizer (such as a space and punctuation tokenizer) first splits sentences into words. A base vocabulary including all symbols occurring in the unique words of the body of text is created. Merge rules are learned to form a new symbol from two symbols of the base vocabulary. The process of creating the base vocabulary and learning merge rules are iterated. |
| WordPiece | A vocabulary is initiated to include every character present in the body of text and progressively learns merge rules. |
| Unigram | A base vocabulary is initialized to a large number of symbols. Each symbol is progressively trimmed down to obtain a smaller vocabulary. |
| Sentence Piece | The sentence is not pre-tokenized. The sentence—including spaces and punctuation—is fed into BPE or Unigram algorithms to construct the vocabulary. | the average as reference campaign embeddings. In various implementations, the machine learning module 128 may save the reference campaign embeddings to embedded reference data 173.

Embedding

Figure 12:
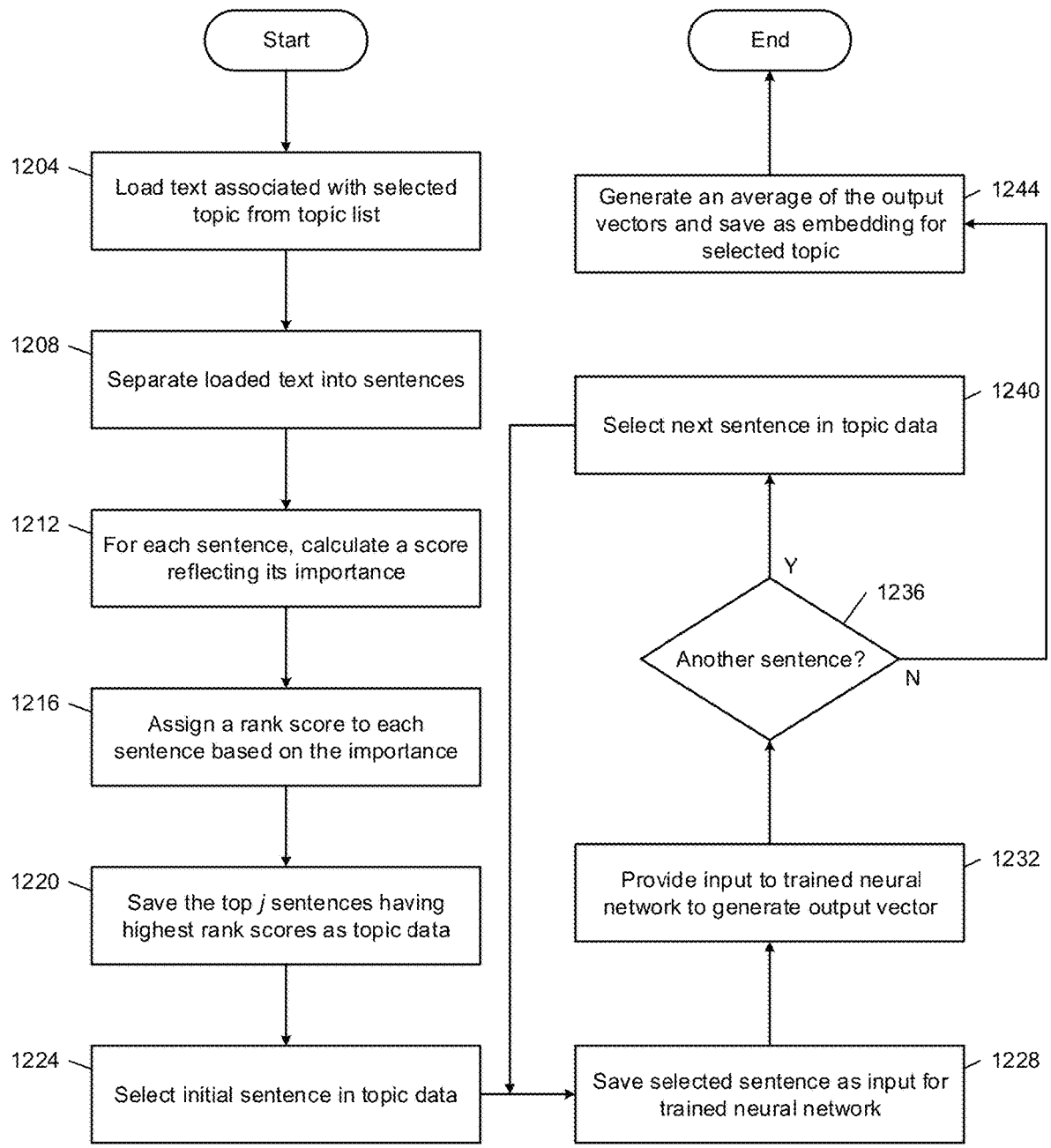
FIG. 12 is a flowchart of an example process for embedding topics.

FIG. 12 is a flowchart of an example process for embedding topics. Control begins at 1204. At 1204, the machine learning module 128 loads text associated with a selected topic from a topic list. In various implementations, the topic may include a string corresponding to a name of the topic and/or one or more strings corresponding to a description of the topic. In various implementations, the topic list data 190 may include the topic list. Control proceeds to 1208. At 1208, the machine learning module 128 separates the loaded text into one or more sentences. Control proceeds to 1212. At 1212, the machine learning module 128 calculates a score for each sentence reflecting the importance of the sentence.

Control proceeds to 1232. At 1232, the machine learning module 128 provides the input vector to the trained machine learning model—such as one of the trained neural networks previously described in this specification. The trained machine learning model generates an output vector based on the input vector. Control proceeds to 1236. At 1236, the machine learning module 128 determines whether another sentence that has not been processed is present in the topic data. If the answer is yes, control proceeds to 1240. Otherwise, control proceeds to 1244. At 1240, the machine learning module 128 selects the next sentence in the topic data and proceeds back to 1228. At 1244, the machine learning module 128 generates an average of the output vector for each sentence of the topic data and saves the average as embeddings for the selected topic. For example, the machine learning module 128 may save the embeddings for the selected topic to embedded topic data 176.

Neural Network Training

Figure 13A:
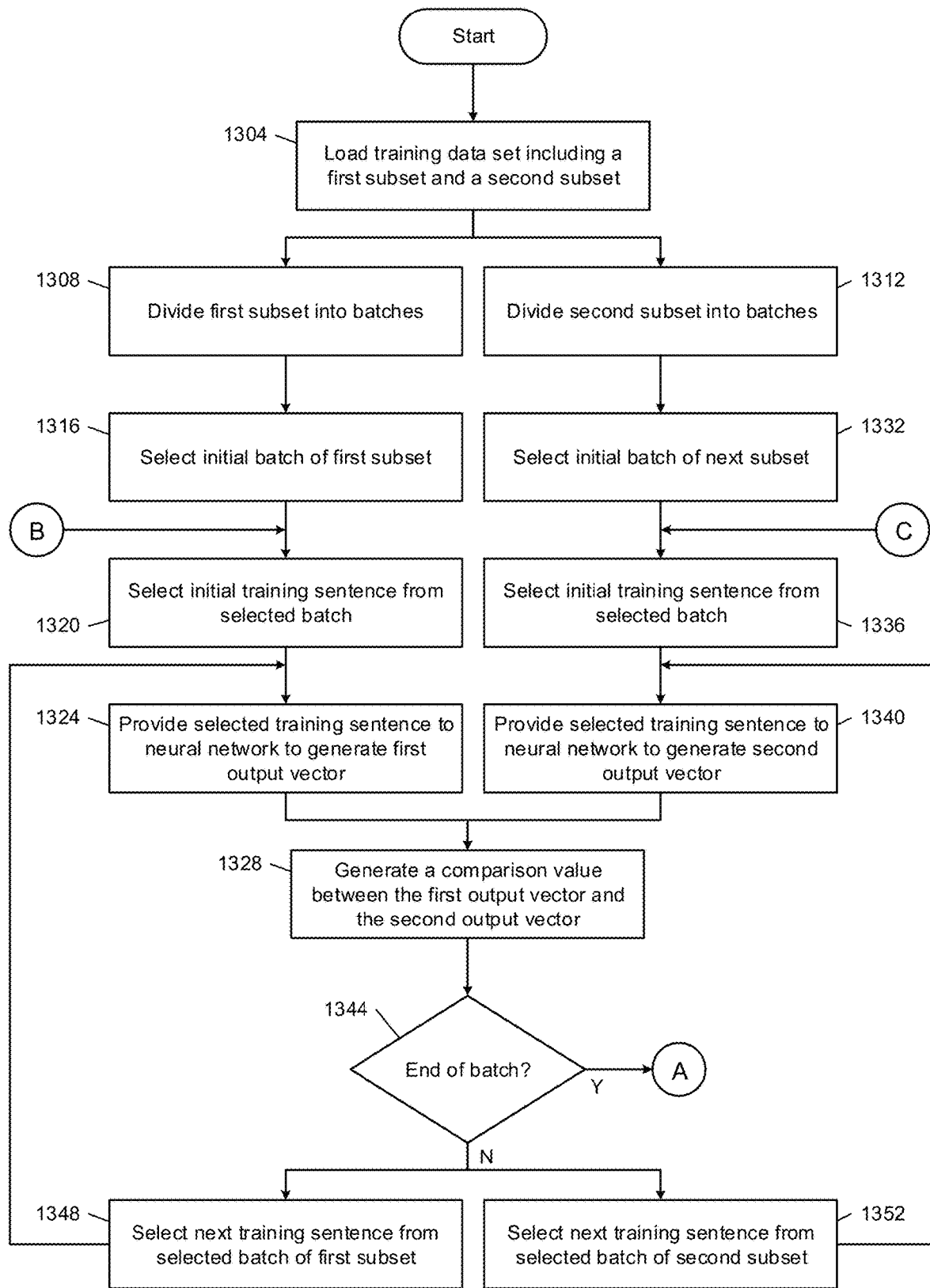
FIG. 13A is a flowchart of an example process for training a neural network.
Figure 13B:
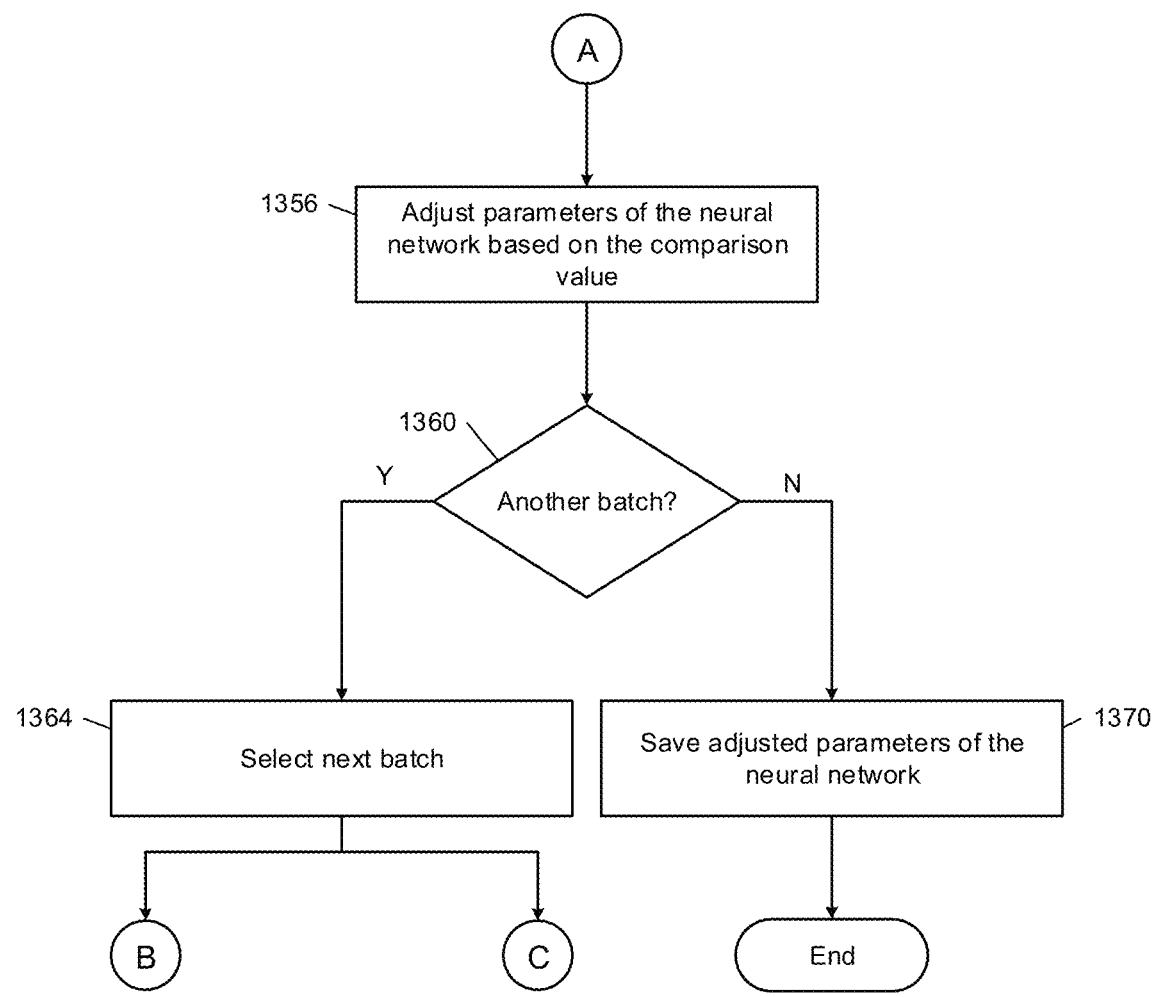
FIG. 13B is a flowchart showing a continuation of the example process of FIG. 13A.

FIG. 13A is a flowchart of an example process for training a neural network. FIG. 13B is a flowchart showing a continuation of the example process of FIG. 13A. Control begins at 1304. At 1304, the machine learning module 128 loads a training data set that includes a first subset and a second subset. In various implementations, the first subset may include one or more application-specific text strings, such as text related to business-to-business transactions. In various implementations, the second subset may include one or more application-specific text strings, such as text related to business-to-business transactions. In various implementations, the first subset may be similar to the second subset. In various implementations, the first subset may be dissimilar to the second subset. In various implementations, the first subset and the second subset may have a same number of sentences. In various implementations, the training data set 196 may include the training data set loaded at 1304. Control proceeds to 1308 and 1312.

At 1308, the machine learning module 128 divides the first subset into one or more batches. Control proceeds to 1316. At 1316, the machine learning module 128 selects an initial batch of the first subset. Control proceeds to 1320. At 1320, the machine learning module 128 selects an initial training sentence from the selected batch. Control proceeds to 1324. At 1324, the machine learning module 128 provides the selected training sentence to the neural network used to implement the machine learning module 128 to generate a first output vector. In various implementations, the machine learning module 128 first transforms the selected training sentence into an input vector before providing the input vector to the neural network. Control proceeds to 1328.

At 1312, the machine learning module 128 divides the second subset into one or more batches. Control proceeds to 1332. At 1332, the machine learning module 128 selects an initial batch of the second subset. Control proceeds to 1336. At 1336, the machine learning module 128 selects an initial training sentence from the selected batch. Control proceeds to 1340. At 1340, the machine learning module 128 provides the selected training sentence to the neural network used to implement the machine learning module 128 to generate a second output vector. In various implementations, the machine learning module 128 first transforms the selected training sentence into an input vector before providing the input vector to the neural network. Control proceeds to 1328.

At 1328, the machine learning module 128 generates a comparison value between the first output vector and the second output vector. In various implementations, the comparison value may be a cosine similarity between the first output vector and the second output vector. If the first output vector is more similar to the second output vector, the cosine similarity will be closer to 1. If the first output vector is more dissimilar to the second output vector, the cosine similarity will be closer to 0 or −1. Control proceeds to 1344. At 1344, the machine learning module 128 determines whether the end of the selected batch—such as the selected batch of the first subset and/or the selected batch of the second subset—has been reached. If the answer is no, control proceeds to 1348 and 1352. Otherwise, if the end of the selected batch has been reached, control proceeds to 1356. At 1348, the machine learning module 128 selects the next training sentence from the selected batch of the first subset. Control proceeds back to 1324. At 1352, the machine learning module 128 selects the next training sentence from the selected batch of the second subset. Control proceeds back to 1352.

At 1356, the machine learning module 128 adjusts the parameters of the neural network based on the comparison value. In various implementations, the target for the comparison value may be 1 if the first subset is known to be similar to the second subset. In various implementations, the target for the comparison value may be 0 or −1 if the first subset is known to be dissimilar to the second subset. The parameters of the neural network—such as the weights and/or biases—may be adjusted. For example, the parameters of the neural network may be adjusted so that the comparison value approaches the target. Control proceeds to 1360. At 1360, the machine learning module 128 determines whether another batch is present in the first subset and/or the second subset. If the answer is yes, control proceeds to 1364. Otherwise, if another batch is not present, control proceeds to 1370. At 1364, machine learning module 128 selects the next batch of the first subset and/or the next batch of the second subset. Control proceeds back to 1320 and 1336. At 1370, the machine learning module 128 saves the adjusted parameters of the neural network. For example, the machine learning module 128 may save the adjusted parameters to machine learning model configuration data 194.

Autodiscovery

Figure 14:
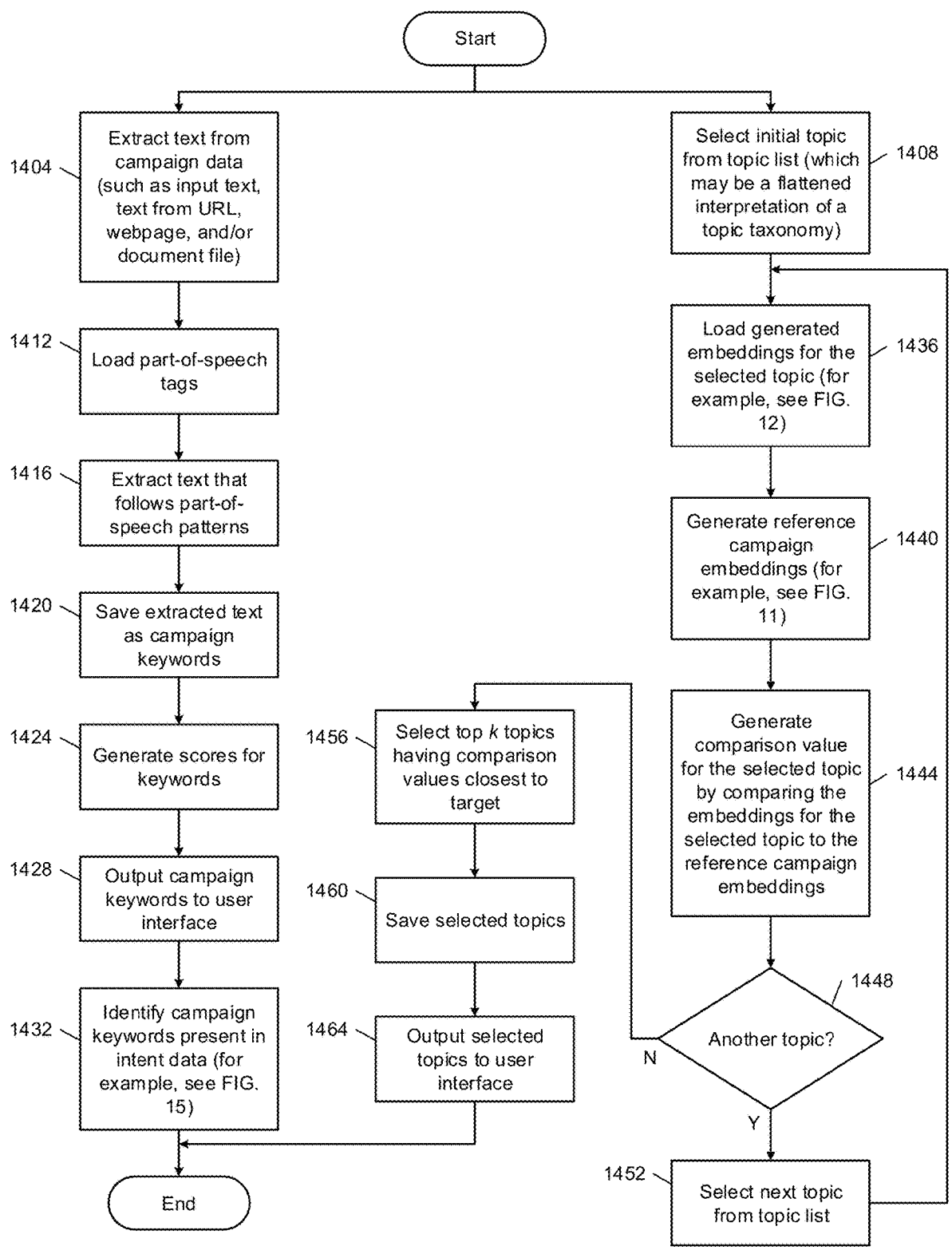
FIG. 14 is a flowchart showing an example autodiscovery process.

FIG. 14 is a flowchart showing an example autodiscovery process. Control begins at 1404 and 1408. At 1404, the autodiscovery module 138 loads campaign data and extract text from the campaign data. In various implementations, the campaign data may include text input by the user at the user interface, and/or text extracted from a URL string, a webpage, and/or a document file—such as text extracted according to any of the techniques previously discussed in this specification. In various implementations, the campaign data may be loaded from raw reference data 170 and/or processed reference data 172. Control proceeds to 1412. At 1412, the autodiscovery module 138 loads part-of-speech tags, such as from part-of-speech tag data 198. Control proceeds to 1416. At 1416, the autodiscovery module 138 extracts text from the campaign data that follows part-of-speech patterns. For example, the autodiscovery module 138 may use part-of-speech tag data 198 to extract word pairs from the text. In various implementations, the word pairs may be noun-noun pairs, adjective-noun pairs, past participle-noun pairs, or any other suitable pairing. Control proceeds to 1420.

At 1420, the autodiscovery module 138 saves the extracted text as campaign keywords. For example, the autodiscovery module 138 may save the campaign keywords to extracted keyword data 182. Control proceeds to 1424. At 1424, the autodiscovery module 138 generates scores for the keywords. Control proceeds to 1428. At 1428, the autodiscovery module 138 outputs the campaign keywords to the user interface. For example, the autodiscovery module 138 may display the campaign keywords on the user interface. Control proceeds to 1432. At 1432, the autodiscovery module 138 identifies keywords that are present in intent data. Additional details of identifying keywords that are present in intent data will be described further on in this specification with respect to FIG. 15.

At 1408, the autodiscovery module 138 selects an initial topic from a topic list. In various implementations, the topic list may be a flattened interpretation of a topic taxonomy. In various implementations, the topic list data 190 may include the topic list. Control proceeds to 1436. At 1436, the autodiscovery module 138 loads generated embeddings for the selected topic. In various implementations, the embeddings for the selected topic may be generated according to the process previously described with reference to FIG. 12.

Control proceeds to 1440. At 1440, the autodiscovery module 138 generates reference campaign embeddings. In various implementations, the reference campaign embeddings may be generated according to the process previously described with reference to FIG. 11. Control proceeds to 1444.

At 1444, the autodiscovery module 138 generates a comparison value for the selected topic by comparing the embeddings for the selected topic to the reference campaign embeddings. In various implementations, the comparison value may be generated by taking a cosine similarity between the embeddings for the selected topic and the reference campaign embeddings. Control proceeds to 1448. At 1448, the autodiscovery module 138 determines whether another topic that has not been processed is present in the topic list. If the answer is yes, control proceeds to 1452. Otherwise, control proceeds to 1456. At 1452, the autodiscovery module 138 selects the next topic from the topic list. At 1456, the autodiscovery module 138 selects the top k topics having comparison values closest to a target. In various implementations, the target may be 1. In various implementations, the autodiscovery module 138 may discard topics below a lower threshold. Control proceeds to 1460. At 1460, the autodiscovery module 138 saves the selected topics. For example, the autodiscovery module 138 may save the selected topics to data store 114. Control proceeds to 1464. At 1464, the autodiscovery module 138 outputs the selected topics to the user interface. In various implementations, the autodiscovery module 138 may display the selected topics on the user interface.

Keyword Identification in Intent Data

Figure 15:
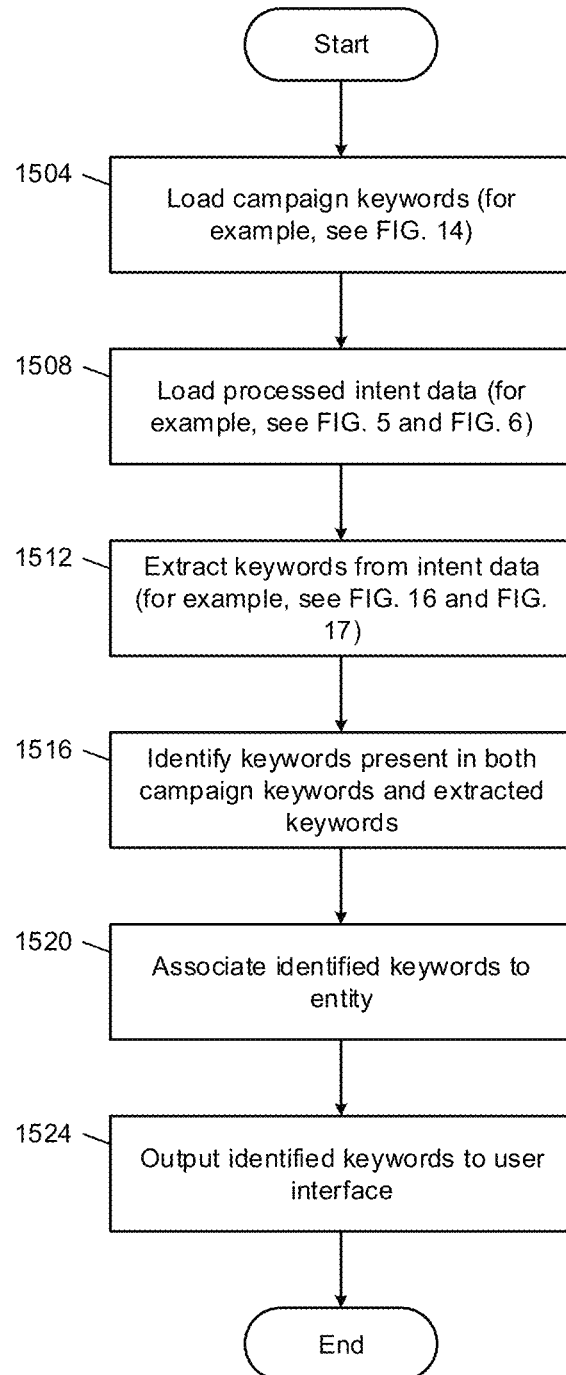
FIG. 15 is a flowchart of an example process for identifying keywords in intent data.

FIG. 15 is a flowchart of an example process for identifying keywords in intent data. Control begins at 1504. At 1504, the autodiscovery module 138 loads campaign keywords. For example, campaign keywords may be generated according to the process described with reference to FIG. 14. Control proceeds to 1508. At 1508, the autodiscovery module 138 loads processed intent data. For example, processed intent data may be generated according to the processes described with reference to FIGS. 5 and 6. Control proceeds to 1512. At 1512, the autodiscovery module 138 and/or the keyword extraction module 141 extracts keywords from the intent data. Additional details of extracting keywords from the intent data will be described further on in this specification with reference to FIGS. 16 and 17. Control proceeds to 1516. At 1516, the autodiscovery module identifies keywords that are present in both the campaign keywords and the extracted keywords. Control proceeds to 1520. At 1520, the autodiscovery module 138 associates identified keywords to an entity. In various implementations, the autodiscovery module 138 may associate the identified keywords to the entity corresponding to the processed intent data. Control proceeds to 1524. At 1524, the autodiscovery module 138 outputs the identified keywords to the user interface. For example, the autodiscovery module 138 may display the identified keywords to the user via the user interface.

Keyword Extraction from URL

Figure 16:
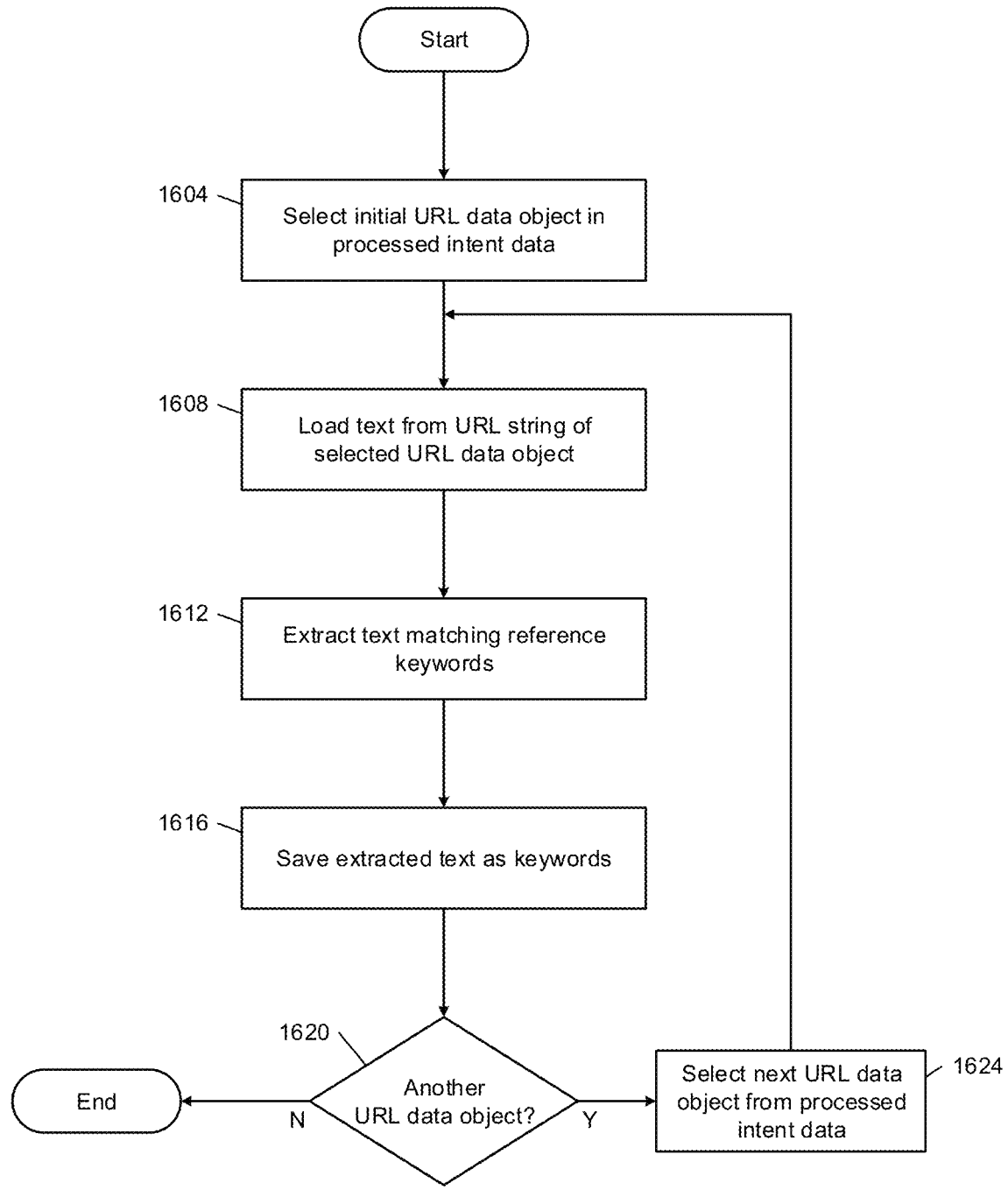
FIG. 16 is a flowchart of an example process for extracting keywords from a URL.

FIG. 16 is a flowchart of an example process for extracting keywords from a URL. Control begins at 1604. At 1604, the autodiscovery module 138 selects an initial URL data object in processed intent data. In various implementations, the processed network data 164 may contain the processed intent data. Control proceeds to 1608. At 1608, the autodiscovery module 138 may load text from the URL string of the selected URL data object. In various implementations, text may also be loaded from a title of the webpage the URL string points to. Control proceeds to 1612. At 1612, the autodiscovery module 138 may extract text that matches reference keywords from the loaded text. In various implementations, reference keywords data 186 may include the reference keywords. Control proceeds to 1616. At 1616, the autodiscovery module 138 saves the extracted text as keywords. Control proceeds to 1620. At 1620, the autodiscovery module 138 determines whether another URL data object is present in the processed intent data. If the answer is yes, control proceeds to 1624, where the autodiscovery module 138 selects the next URL data object from the processed intent data and proceeds back to 1608. Otherwise, control ends.

Keyword Extraction from Webpage

Figure 17:
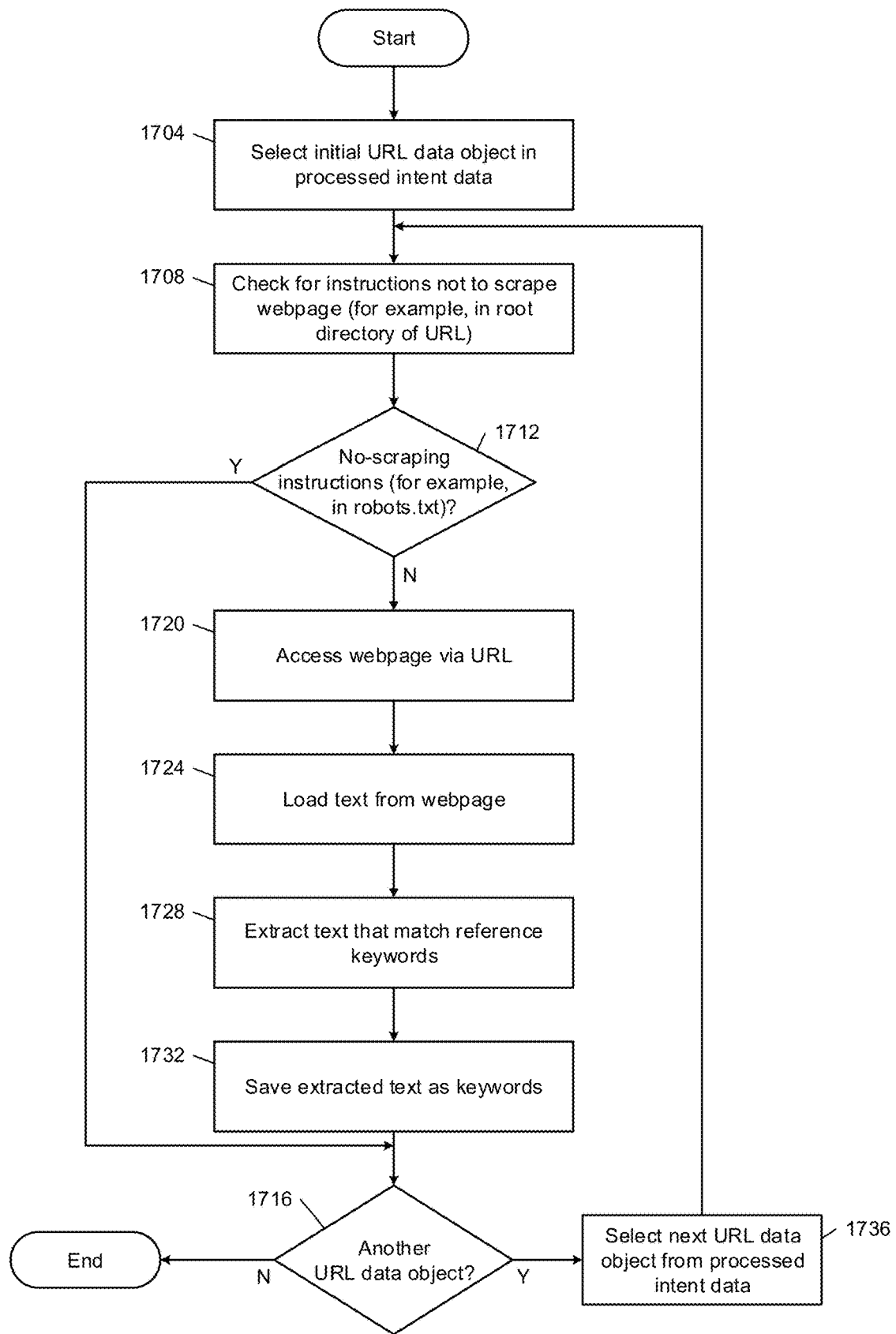
FIG. 17 is a flowchart of an example process for extracting keywords from a webpage.

FIG. 17 is a flowchart of an example process for extracting keywords from a webpage. Control begins at 1704. At 1704, the autodiscovery module 138 calls the webpage scraping module 122 to select an initial URL data object in the processed intent data. Control proceeds to 1708. At 1708, the webpage scraping module 122 checks the website for instructions not to scrape the webpage. For example, the webpage scraping module 122 may check the root directory of the URL for no-scraping instructions, such as no-scraping instructions present in a "robots.txt" file. Control proceeds to 1712. At 1712, the webpage scraping module 122 determines whether no-scraping instructions are present. If yes, control proceeds to 1716. Otherwise, control proceeds to 1720. At 1720, the webpage scraping module 122 accesses the webpage pointed to by the URL. Control proceeds to 1724.

At 1724, the webpage scraping module 122 loads text from the webpage and passes the loaded text to the autodiscovery module 138. Control proceeds to 1728. At 1728, the autodiscovery module 138 extracts text that match reference keywords from the loaded text. Control proceeds to 1732. At 1732, the autodiscovery module 138 saves the extracted text as keywords. Control proceeds to 1716. At 1716, the autodiscovery module 138 determines whether another URL data object that has not been processed is present in the processed intent data. If the answer is yes, control proceeds to 1736, where the autodiscovery module 138 selects the next URL data object from the processed intent data and proceeds back to 1708. Otherwise, control ends.

Topic List Generation

Figure 18:
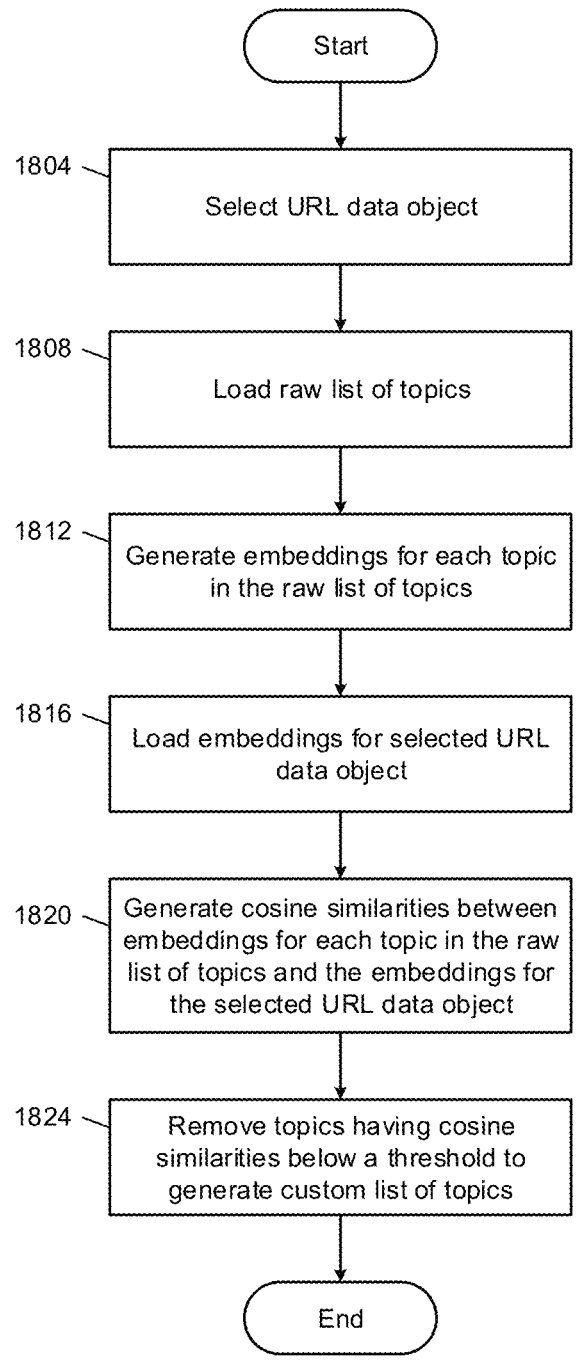
FIG. 18 is a flowchart of an example process for generating a custom list of topics.

FIG. 18 is a flowchart of an example process for generating a custom list of topics. Control begins at 1804. At 1804, the stage score generation module 140 selects a URL data object from the processed intent data—such as from processed network data 164. Control proceeds to 1808. At 1808, the stage score generation module 140 loads a raw list of topics—such as from topic list data 190. Control proceeds to 1812. At 1812, the stage score generation module 140 and/or the machine learning module 128 generates embeddings for each topic in the raw list of topics—such as according to any of the previously described techniques. Control proceeds to 1816.

At 1816, the stage score generation module 140 loads embeddings for the selected URL data object. Control proceeds to 1820. At 1820, the stage score generation module 140 generates cosine similarities between embeddings for each topic and the embeddings for the selected URL data object. Control proceeds to 1824. At 1824, the stage score generation module 140 removes topics having associated cosine similarities below a threshold from the raw list of topics and saves the updated list of topics as the custom list of topics. In various implementations, the stage score generation module 140 saves the custom list of topics to topic list data 190. In various implementations, the threshold may be about 0.5.

URL Topic Score Generation

Figure 19:
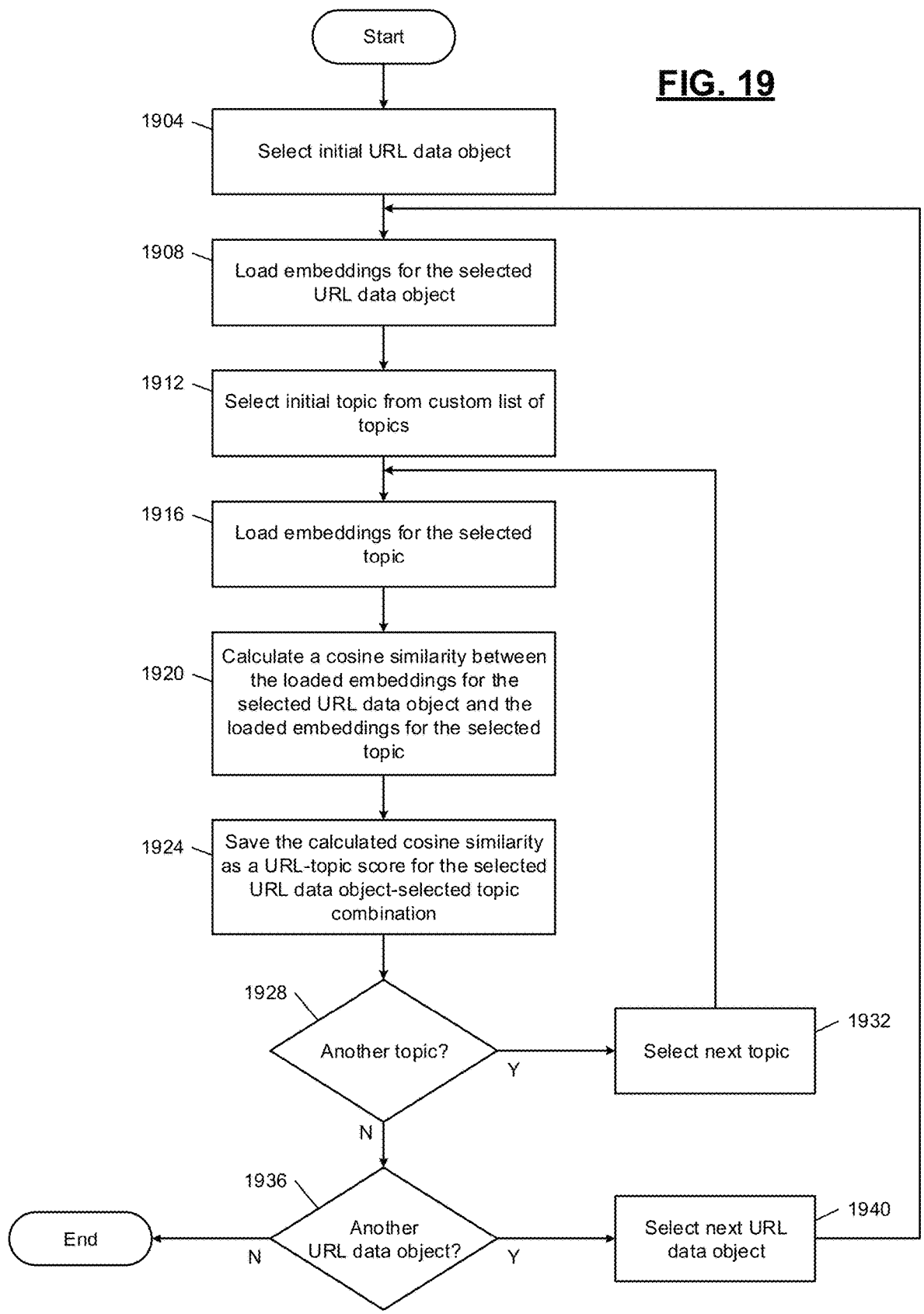
FIG. 19 is a flowchart of an example process for generating URL-topic scores.

FIG. 19 is a flowchart of an example process for generating URL-topic scores. Control begins at 1904. At 1904, the stage score generation module 140 selects an initial URL data object from the processed intent data. Control proceeds to 1908. At 1908, the stage score generation module 140 loads embeddings for the selected URL data object. Control proceeds to 1912. At 1912, the stage score generation module 140 selects an initial topic from the custom list of topics. Control proceeds to 1916. At 1916, the stage score generation module 140 loads embeddings for the selected topic. Control proceeds to 1920. At 1920, the stage score generation module 140 calculates a cosine similarity between the loaded embeddings for the selected URL data object and the loaded embeddings for the selected topic. Control proceeds to 1924.

At 1924, the stage score generation module 140 saves the calculated cosine similarity as a URL-topic score for the selected URL data object-selected topic combination. In various implementations, the stage score generation module 140 may save the URL-topic score to stage score data 188. Control proceeds to 1928. At 1928, the stage score generation module 140 determines whether another topic is present. If the answer is yes, control proceeds to 1932, where the stage score generation module 140 selects the next topic and proceeds back to 1916. Otherwise, control proceeds to 1936. At 1936, the stage score generation module 140 determines whether another URL data object is present. If yes, control proceeds to 1940, where the stage score generation module 140 selects the next URL data object. Otherwise, control ends.

URL Stage Score Generation

Figure 20:
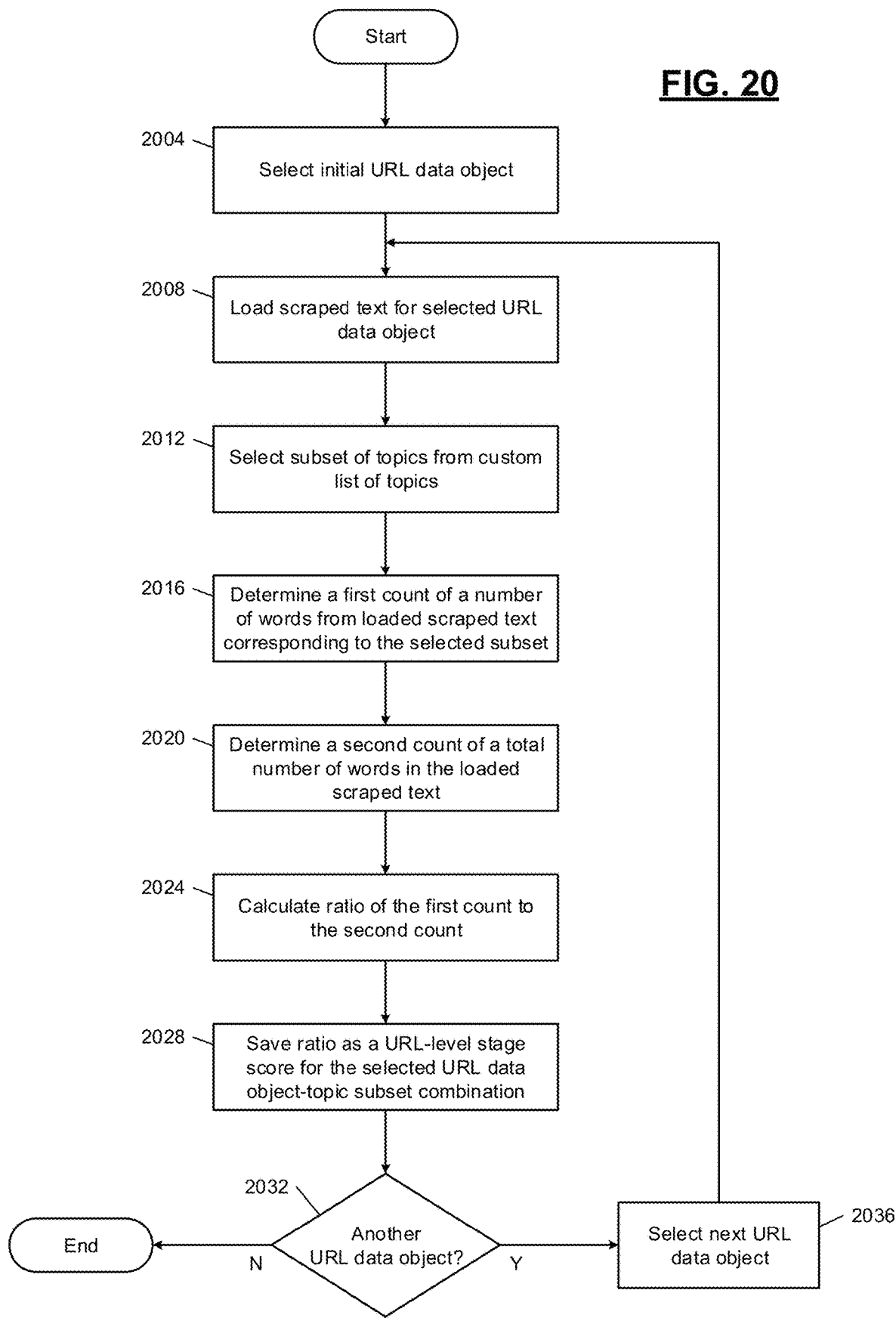
FIG. 20 is a flowchart of an example process for generating URL-level stage scores.

FIG. 20 is a flowchart of an example process for generating URL-level stage scores. Control begins at 2004. At 2004, the stage score generation module 140 selects an initial URL data object from the processed intent data. Control proceeds to 2008. At 2008, the stage score generation module 140 loads scraped text for the selected URL data object. Control proceeds to 2012. At 2012, the stage score generation module 140 selects a subset of topics from the custom list of topics. In various implementations, the subset of topics may correspond to products and/or companies selected by a user. In various implementations, the subset of topics may correspond to products and/or companies selected by the user and having a URL-topic score above a threshold. In various implementations, the threshold may be about 0.4. Control proceeds to 2016. At 2016, the stage score generation module 140 determines a first count. In various implementations, the first count may be a number of words from the loaded scraped text that correspond to the selected subset of topics. For example, the first count may be a number of words from the loaded scraped text that correspond to the products and/or companies selected by the user. Control proceeds to 2020.

At 2020, the stage score generation module 140 determines a second count. In various implementations, the second count may be a total number of words present in the loaded scraped text. Control proceeds to 2024. At 2024, the stage score generation module 140 calculates a ratio of the first count to the second count. In various implementations, the ratio may be calculated by dividing the first count by the second count. Control proceeds to 2028. At 2028, the stage score generation module 140 saves the ratio as a URL-level stage score for the selected URL data object-topic subset combination. In various implementations, the URL-level stage score may be saved to stage score data 188. Control proceeds to 2032. At 2032, the stage score generation module 140 determines whether another URL data object is present. If yes, control proceeds to 2036, where the stage score generation module 140 selects the next URL data object and proceeds back to 2008. Otherwise, control ends.

URL Campaign Score Generation

Figure 21:
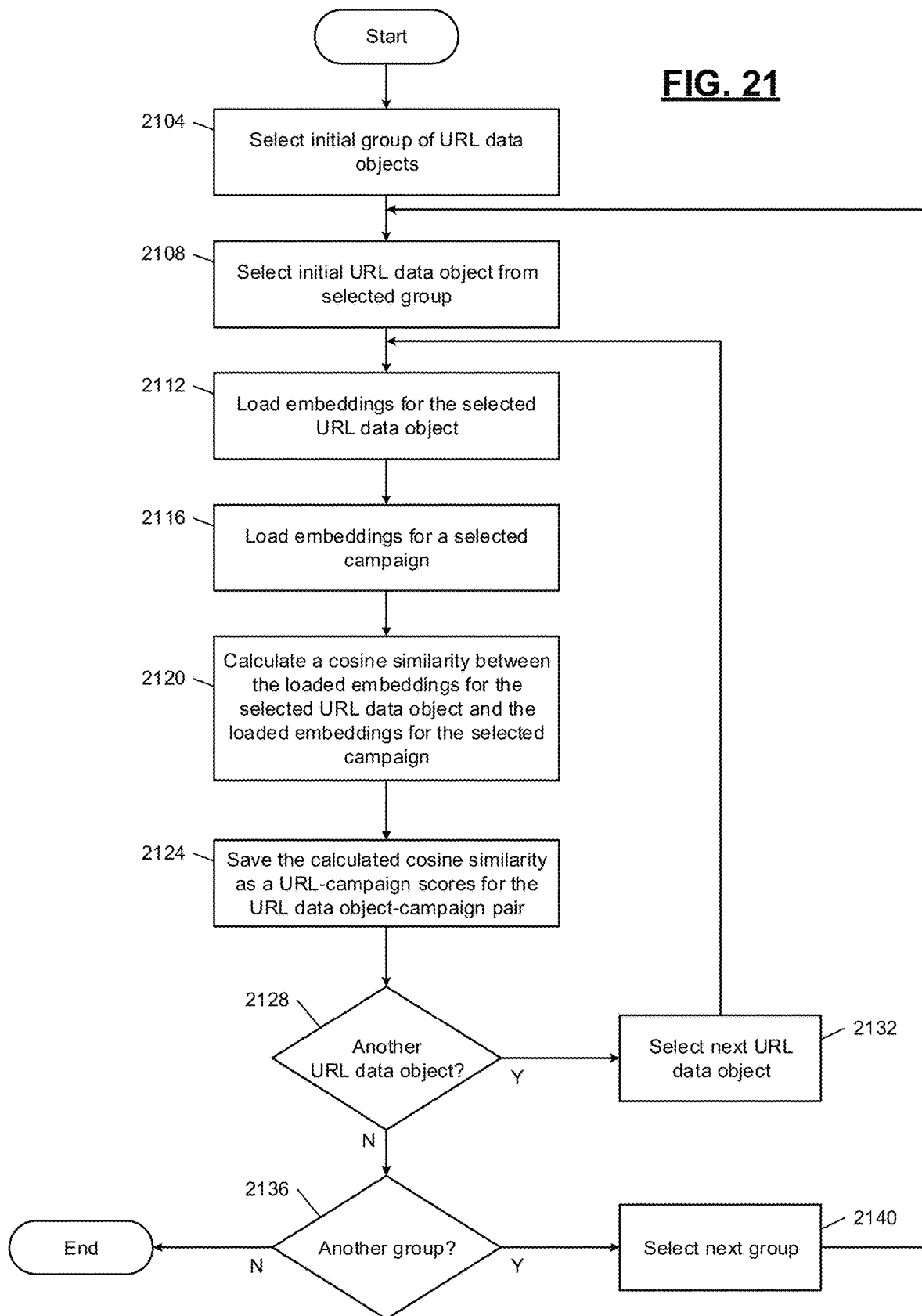
FIG. 21 is a flowchart of an example process for generating URL-campaign scores.

FIG. 21 is a flowchart of an example process for generating URL-campaign scores. Control begins at 2104. At 2104, the stage score generation module 140 selects an initial group of URL data objects from processed intent data. Control proceeds to 2108. At 2108, the stage score generation module 140 selects an initial URL data object from the selected group of URL data objects. Control proceeds to 2112. At 2112, the stage score generation module 140 loads embeddings for the selected URL data object. Control proceeds to 2116. At 2116, the stage score generation module 140 loads embeddings for a selected campaign, such as a campaign specified by a user. Control proceeds to 2120. At 2120, the stage score generation module 140 calculates a cosine similarity between the loaded embeddings for the selected URL data object and the loaded embeddings for the selected campaign. Control proceeds to 2124.

At 2124, the stage score generation module 140 saves the calculated cosine similarity as URL-campaign scores for the URL data object-campaign pair. For example, the URL-campaign scores may be saved to stage score data 188. Control proceeds to 2128. At 2128, the stage score generation module 140 determines whether another URL data object is present. If yes, control proceeds to 2132, where the stage score generation module 140 selects the next URL data object and proceeds back to 2112. Otherwise, control proceeds to 2136. At 2136, the stage score generation module 140 determines whether another group is present. If yes, control proceeds to 2140, where the stage score generation module 140 selects the next group and proceeds back to 2108. Otherwise, control ends.

Topic-Level Stage Score Generation

Figure 22:
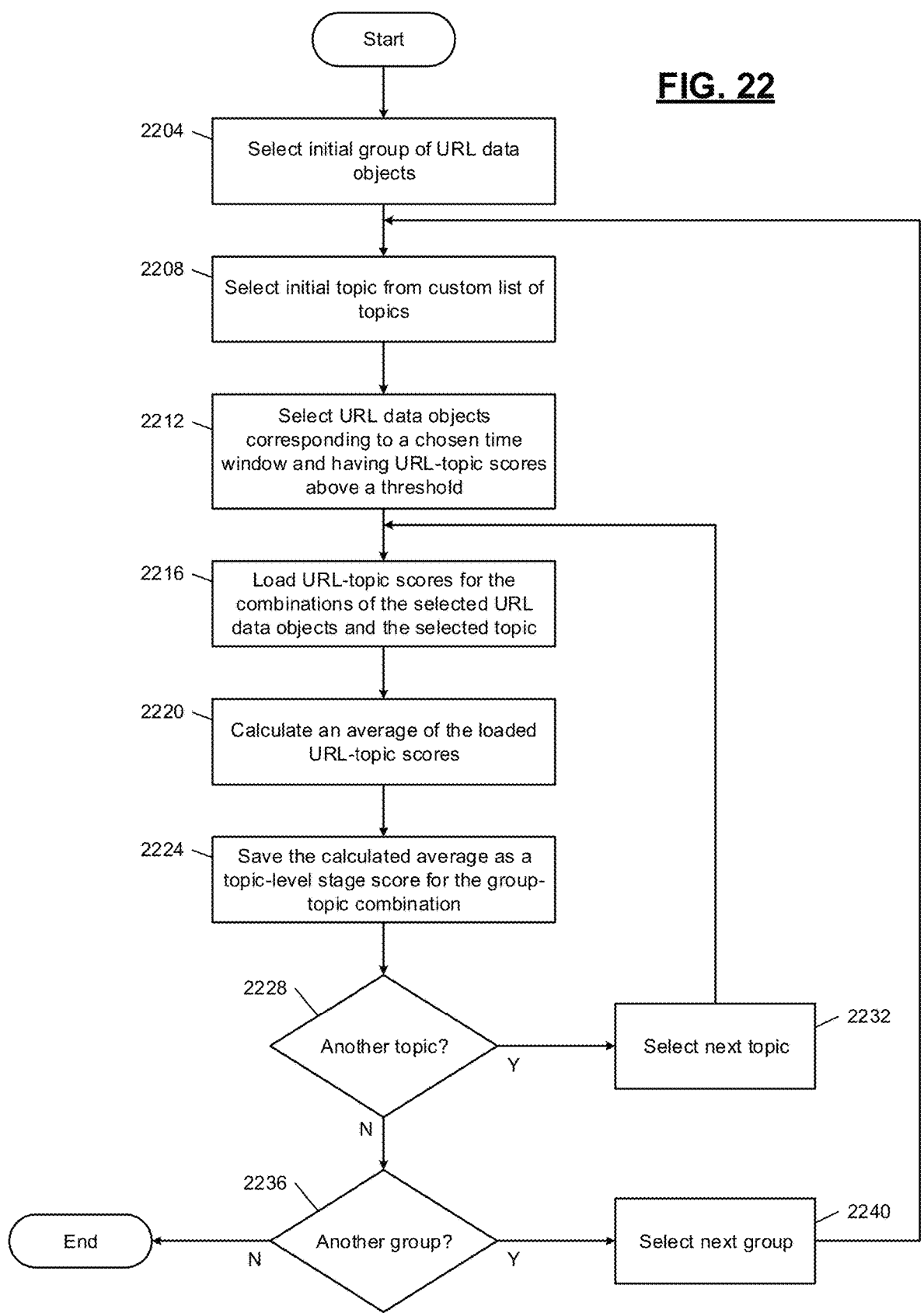
FIG. 22 is a flowchart of an example process for generating topic-level stage scores.

FIG. 22 is a flowchart of an example process for generating topic-level stage scores. Control begins at 2204. At 2204, the stage score generation module 140 selects an initial group of URL data objects. Control proceeds to 2208. At 2208, the stage score generation module 140 selects an initial topic from the custom list of topics. Control proceeds to 2212. At 2212, the stage score generation module 140 selects URL data objects from the selected group of URL data objects that correspond to a chosen time window and having URL-topic scores above a threshold. For example, the selected URL data objects may have time stamps within the chosen time window. In various implementations, the chosen time window may be one week. In various implementations, the chosen time window may be the immediately preceding week. In various implementations, the threshold may be about 0.5. Control proceeds to 2216.

At 2216, the stage score generation module 140 loads URL-topic scores corresponding to combinations of the selected URL data objects and the selected topic. For example, URL-topic scores may be loaded for each combination of the selected topic and each URL data object selected at 2212. Control proceeds to 2220. At 2220, the stage score generation module 140 calculates an average of the loaded URL-topic scores, such as the URL-topic scores loaded at 2216. Control proceeds to 2224. At 2224, the stage score generation module 140 saves the calculated average as a topic-level stage score for the group-topic combination. Control proceeds 2228. At 2228, the stage score generation module 140 determines whether another topic is present. If yes, control proceeds to 2232, where the stage score generation module 140 selects the next topic and proceeds back to 2208. Otherwise, control proceeds to 2236. At 2236, the stage score generation module 140 determines whether another group is present. If yes, control proceeds to 2240, where the stage score generation module selects the next group and proceeds back to 2208. Otherwise, control ends.

Account-Level Stage Score Generation

Figure 23:
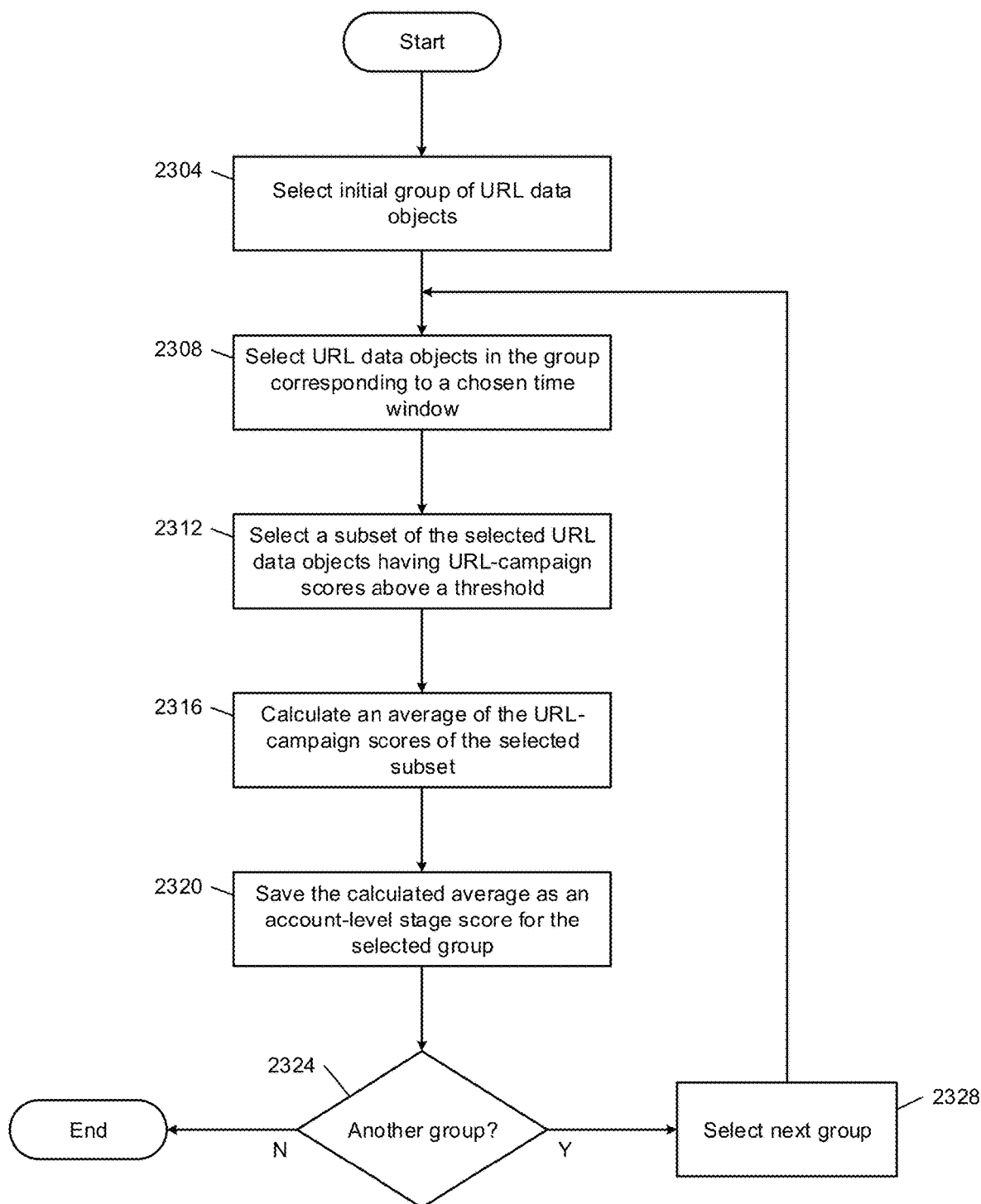
FIG. 23 is a flowchart of an example process for generating account-level stage scores.

FIG. 23 is a flowchart of an example process for generating account-level stage scores. Control begins at 2304. At 2304, the stage score generation module 140 selects an initial group of URL data objects. Control proceeds to 2308. At 2308, the stage score generation module 140 selects URL data objects in the group corresponding to a chosen time window. For example, the selected URL data objects may have time stamps within the chosen time window. In various implementations, the chosen time window may be one week. In various implementations, the chosen time window may be the immediately preceding week. Control proceeds to 2312.

At 2312, the stage score generation module 140 selects a subset of the selected URL data objects—such as those selected at 2308—having URL-campaign scores above a threshold. In various implementations, the threshold may be about 0.5. Control proceeds to 2316. At 2316, the stage score generation module 140 calculates an average of the URL-campaign scores of the selected subset. At 2320, control saves the calculated average as an account-level stage score for the selected group. At 2324, the stage score generation module 140 determines whether another group is present. If yes, control proceeds to 2328, where the stage score generation module 140 selects the next group; otherwise, control ends.

Target Account List Creation

Certain individuals (for example, marketers) may desire to have target account lists created that include target entities (for example, organizations, companies, business entities, universities, and/or groups, among others) such that the individuals can target the target entities with campaigns (for example, marketing campaigns). The individuals may also use the lists to identify target markets, develop target customer profiles, create effective marketing strategies, and/or make informed business decisions, etc. The target account lists may be created using firmographic data. The firmographic data may include industry data, entity size data, geographical location data, ownership type data, entity age data, financial data, entity structure data, customer base data, technology adoption data, and/or strategic initiatives data, among others.

In various implementations, the industry data may include data relating to the sector or the industry in which an entity operates, such as healthcare, technology, automotive, retail, manufacturing, finance, etc. The entity size data may include data relating to size of an entity, for example, the number of employees and/or the annual revenue generated by the entity, etc. The geographical location data may include data relating to the physical location(s) of where an entity operates, for example, the country, the state, the city, and/or the region, etc. The ownership type data may include data relating to the legal structure and/or the ownership type of an entity, for example, public, private, government-owned, non-profit, partnership, and/or sole proprietorship, etc. The entity age data may include data relating to the age and/or the tenure of an entity, for example, data indicating whether the entity is a startup, an established business, and/or a long-standing entity, etc.

In various implementations, the financial data may include data relating to financial information about an entity, for example, the revenue, the profit margin, the annual growth rate, the funding sources, and/or the financial stability, etc. The entity structure data may include data relating to the hierarchical structure, the decision-making processes, and/or the reporting lines within an entity, including divisions, departments, subsidiaries, and franchises, etc. The customer base data may include data relating to the target customer segments or types of customers an entity serves, including businesses and/or consumers, etc. The technology adoption data may include data relating to the level of technological advancement and/or adoption within an entity, including the use of specific software, tools, and/or systems, etc. The strategic initiatives data may include data relating to an entity's goals, objectives, and/or strategic focus areas, such as expansion, innovation, sustainability, or digital transformation, etc.

Using the firmographic data to create the target account lists is a difficult and time intensive undertaking, since the firmographic data typically includes a large volume of data from a variety of sources. The firmographic data typically requires a substantial amount of time to process, review, and/or filter. The firmographic data often includes data having low quality, reliability issues, compatibility issues, and/or data privacy and security concerns. The firmographic data is typically maintained in a large database which is a challenge for the custodians of the database to keep complete and accurate.

In various implementations, the system 100 may be configured to generate target account lists via one or more processes described herein. For example, the system 100 may be configured to receive target input data, scrape data from various websites, analyze and/or compare the scraped data in view of the target input data, generate scores that identify the closest target entity website matches, and/or generate the target account lists that include the websites and/or domain names associated with the target entities.

Figure 24A:
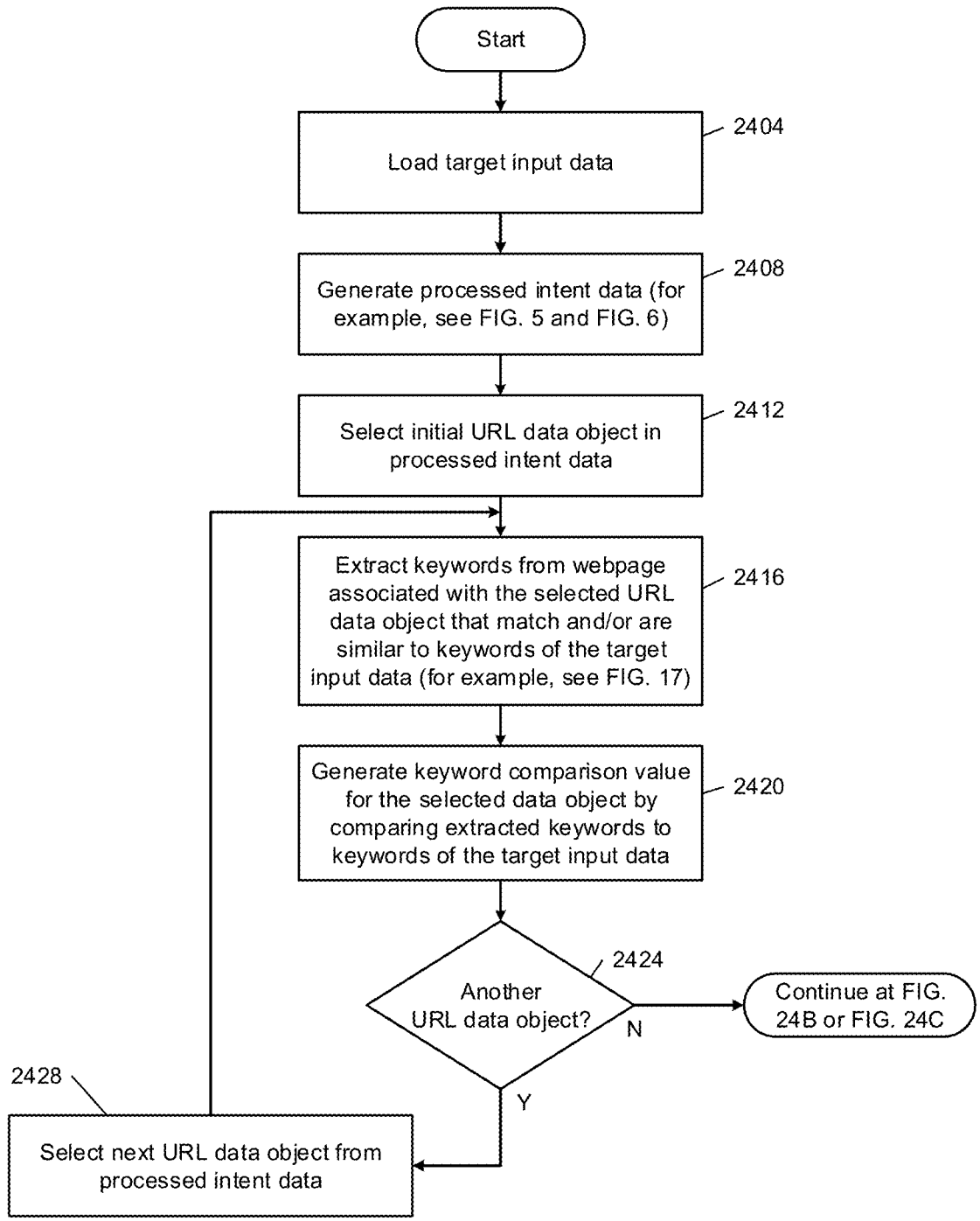
FIGS. 24A-24C are flowcharts of an example process for generating target account lists.
Figure 24B:
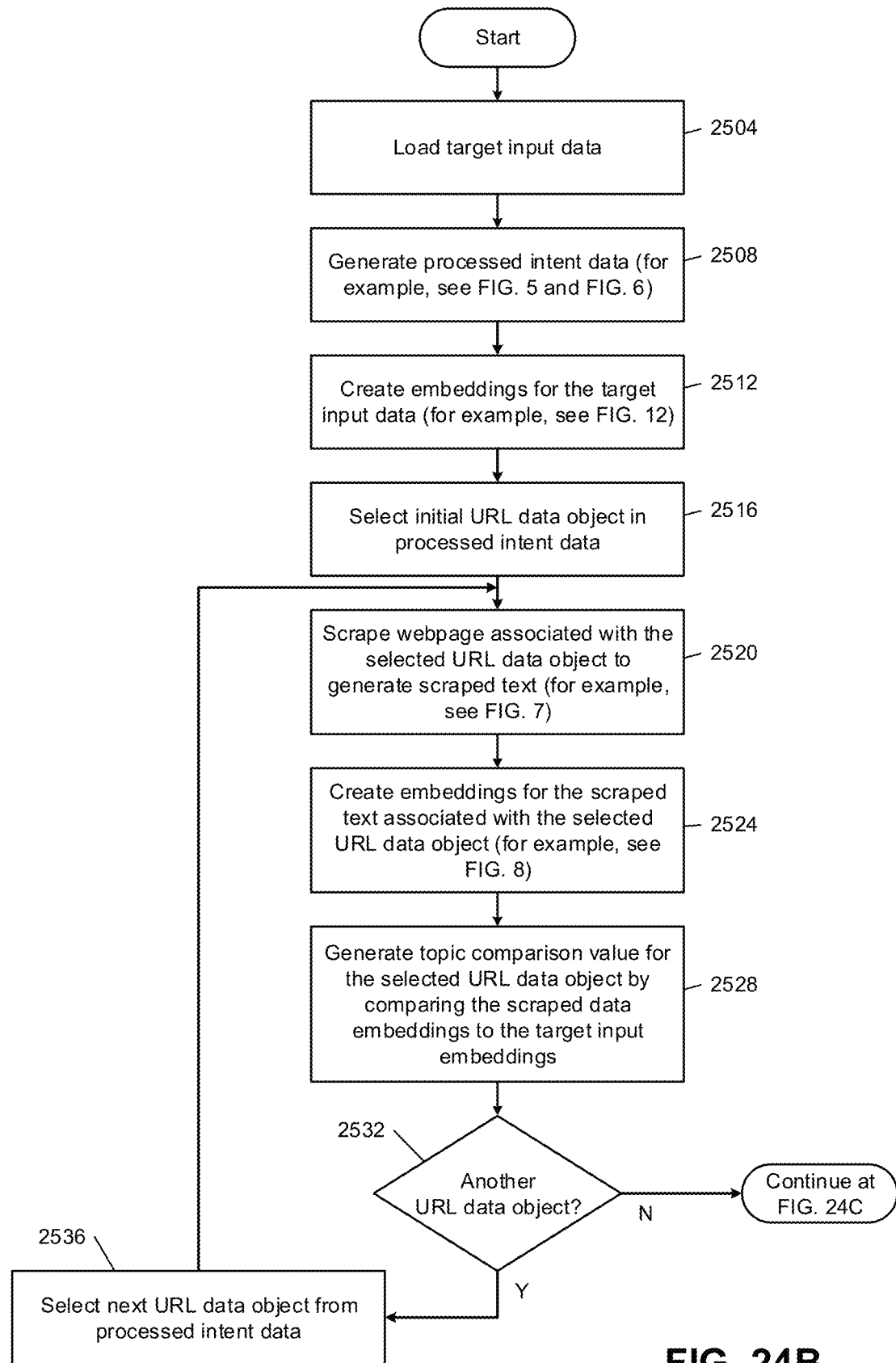
Figure 24C:
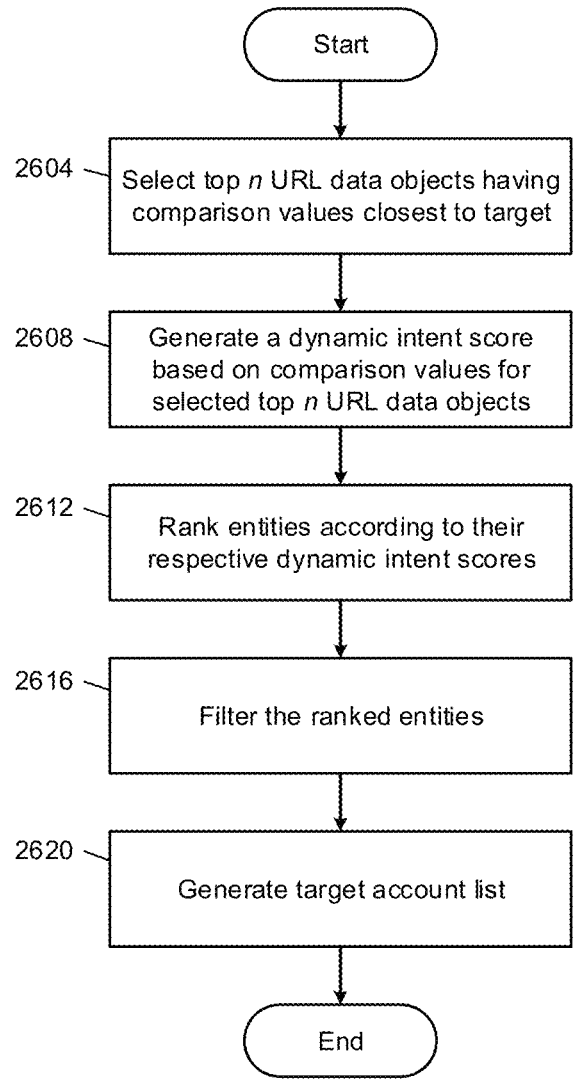

FIGS. 24A-24C are flowcharts of an example process for generating target account lists. With reference to FIG. 24A, control begins at 2404. At 2404, the webpage processing module 124 may load target input data (for example, keyword input data). In some implementations, the target input data may originate from the individuals who desire to have the target account lists created. The target input data may include a text file format and/or may be inputted into the system 100 via a user interface.

In various implementations, the target input data may include keyword input data, topic input data, and/or website input data, among others. The keyword input data may include keywords that the individuals desire to locate in the target entity websites. The topic input data may include topics that the individuals desire to locate in the target entity websites. The website input data may include a set of websites (for example, URLs, domain names, etc.) that are similar to the target entity websites that the individuals desire to locate. In examples where the target input data does not include keyword input data, control may begin at 2504 of FIG. 24B and not at 2404. Control proceeds to 2408.

At 2408, the system 100 generates processed intent data. Additional details of generating processed intent data at 2408 are described in this specification with reference to FIGS. 5 and 6. Control proceeds to 2412. At 2412, the autodiscovery module 138 calls the webpage scraping module 122 to select an initial URL data object in the processed intent data. Additional details of selecting an initial URL data object in the processed intent data at 2412 are described in this specification. Control proceeds to 2416.

At 2416, the keyword extraction module 141, extracts and/or locates keywords from the webpage associated with the selected URL data object that match and/or are similar to the keywords of the keyword input data. Additional details of extracting the keywords from the webpage associated with the selected URL data object are described in this specification with reference to FIG. 17. Control proceeds to 2420. At 2420, the signal score generation module 132 generates a comparison value (for example, a keyword comparison value) for the selected URL data object by comparing the extracted and/or located keywords with the keywords of the keyword input data.

In some examples, exact matched keywords may be associated with a greater comparison value and/or may be assigned a greater weight than keywords that are merely similar (for example, not an exact match). Certain user defined priority keywords may be associated with a greater comparison value and/or may be assigned a greater weight than other less prioritized keywords. The percentage of the input keywords that are extracted and/or located in the selected webpage may be reflected in the comparison value—with larger percentages being associated with larger comparison various. In some instances, the comparison value may be in a range of between about −1 and about 1. In other instances, the comparison value may be in a range of between about 0 and about 1. Additional details of generating the comparison value for the selected URL data object are described in this specification. Control proceeds to 2424.

At 2424, the autodiscovery module 138 determines whether another URL data object that has not been processed is present in the processed intent data. If the answer is yes, control proceeds to 2428, where the autodiscovery module 138 selects the next URL data object from the processed intent data and proceeds back to 2416. Otherwise, control may proceed to 2504 of FIG. 24B or 2604 of FIG. 24C. For example, in accordance with the target input data including topic input data and/or website input data, control proceeds to 2505 of FIG. 24C otherwise control proceeds to 2604 of FIG. 24C.

With reference to FIG. 24B, control begins at 2504. At 2504, the webpage processing module 124 may load target input data (for example, topic input data and/or website input data). Control proceeds to 2508. At 2508, the system 100 generates processed intent data. Additional details of generating processed intent data at 2508 are described in this specification with reference to FIGS. 5 and 6. Control proceeds to 2512. At 2512, the machine learning module 128 creates embeddings for the target input data (for example, the topic input data and/or the website input data). Additional details of creating embeddings for the target input data at 2512 are described in this specification with reference to FIG. 12. Control proceeds to 2516.

At 2516, the autodiscovery module 138 calls the webpage scraping module 122 to select an initial URL data object in the processed intent data. Additional details of selecting an initial URL data object in the processed intent data at 2516 are described in this specification. Control proceeds to 2520. At 2520, the webpage scraping module 122 and/or the webpage processing module 124 scrapes the webpage associated with the URL of the selected URL data object and generates scraped text. In various implementations, the scraped text may be stored in the raw webpage data 166 and/or the processed webpage data 168. Additional details of generating scraped text at 2520 are described in this specification with reference to FIG. 7. Control proceeds to 2524.

At 2524, the machine learning module 128 creates embeddings for the scraped text associated with the selected URL data object. In various implementations, the embeddings may be a signed vector saved to embedded network data 174. Additional details of the embedding process at 2524 are described in this specification with reference to FIG. 8. Control proceeds to 2528. At 2528, the signal score generation module 132 generates a comparison value (for example, a topic comparison value and/or a website comparison value) for the selected URL data object by comparing the embeddings for the scraped text associated with the URL data object to the target input data embeddings. In some instances, the comparison value may be in a range of between about −1 and about 1. In other instances, the comparison value may be in a range of between about 0 and about 1. Additional details of generating the comparison value for the selected URL data object are described in this specification. Control proceeds to 2532.

At 2532, the autodiscovery module 138 determines whether another URL data object that has not been processed is present in the processed intent data. If the answer is yes, control proceeds to 2536, where the autodiscovery module 138 selects the next URL data object from the processed intent data and proceeds back to 2520. Otherwise, control proceeds to 2604 of FIG. 24C.

With reference to FIG. 24C, control begins at 2604. At 2604, the dynamic score generation module 130 selects the top n URL data objects having comparison values (for example, keyword comparison values, topic comparison values, and/or the website comparison values) closest to a target. In various implementations, the target may be 1. The dynamic score generation module 130 may prioritize keyword comparison values over topic comparison values and/or website comparison values. For example, the dynamic score generation module 130 may combine the keyword comparison value, the topic comparison value, and/or the website comparison value associated with a URL data object via heuristics to generate a total comparison value for each URL data object. For instance, the keyword comparison value, the topic comparison value, and/or the website comparison value may be combined via a weighted average. For example and without limitation, 50 percent may be assigned to the keyword comparison value, 25 percent may be assigned to the topic comparison value, and/or 25 percent may be assigned to the website comparison value.

In various implementations, the dynamic score generation module 130 may select the top n URL data objects having characteristics above user defined thresholds, for example and without limitation, the top 200 URL data objects and/or URL data objects with comparison values (for example, total comparison values) greater than 0.6, among others. Additional details of selecting the top n URL data objects are described in this specification. Control proceeds to 2608.

At 2608, the dynamic score generation module 130 generates a dynamic intent score based on the comparison values for the top n URL data objects. In various implementations, the dynamic intent score may be saved to dynamic score data 178. Additional details of generating the dynamic intent scores are described in this specification Control proceeds to 2612.

At 2612, the dynamic score generation module 130 ranks the entities according to their assigned dynamic intent scores. In various implementations, the entities may be ranked from highest to lowest dynamic intent score. Additional details of ranking the entities according to their assigned dynamic intent scores are described in this specification. Control proceeds to 2616.

At 2616, the filter module 143 may filter the ranked entities according to a set of user-defined firmographic thresholds to identify a subset of the entities that meet or exceed the thresholds. The set of user-defined thresholds may be associated with firmographic data such as entity size data, geographical location data, and/or financial data, among others. For example, a user may desire to identify the ranked entities that meet or exceed a number-of-employees threshold (for example, 500 employees), etc. In various implementations, the filter module 143 may receive a set of user inputs associated with the set of user-defined thresholds from a user device and may query one or more data stores (for example, data stores 114, 150) to determine whether each ranked entity meets or exceeds a threshold of the set of user-defined thresholds. Control proceeds to 2620.

At 2620, the dynamic score generation module 130 may generate and output a target account list that includes the websites and/or the domain names associated with the entities and/or the subset of the entities. The target account list may display the entities in order of their respective dynamic intent scores and/or in alphabetic order of their domain names, among others. In various implementations, the target account lists may include a text file format, for example and without limitation, a plain text format, a comma-separated values (CSV) format, and/or an extensible markup language (XML) format, among others. In various implementations, the dynamic score generation module 130 may generate and output the target account list to a graphical user interface.

CONCLUSION

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. In the written description and claims, one or more steps within a method may be executed in a different order (or concurrently) without altering the principles of the present disclosure. Similarly, one or more instructions stored in a non-transitory computer-readable medium may be executed in a different order (or concurrently) without altering the principles of the present disclosure. Unless indicated otherwise, numbering or other labeling of instructions or method steps is done for convenient reference, not to indicate a fixed order.

Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules) are described using various terms, including "connected," "engaged," "interfaced," and "coupled." Unless explicitly described as being "direct," when a relationship between first and second elements is described in the above disclosure, that relationship encompasses a direct relationship where no other intervening elements are present between the first and second elements, and also an indirect relationship where one or more intervening elements are present (either spatially or functionally) between the first and second elements.

The phrase "at least one of A, B, and C" should be construed to mean a logical (A OR B OR C), using a non-exclusive logical OR, and should not be construed to mean "at least one of A, at least one of B, and at least one of C." The term "set" does not necessarily exclude the empty set—in other words, in some circumstances a "set" may have zero elements. The term "non-empty set" may be used to indicate exclusion of the empty set—in other words, a non-empty set will always have one or more elements. The term "subset" does not necessarily require a proper subset. In other words, a "subset" of a first set may be coextensive with (equal to) the first set. Further, the term "subset" does not necessarily exclude the empty set—in some circumstances a "subset" may have zero elements.

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include processor hardware (shared, dedicated, or group) that executes code and memory hardware (shared, dedicated, or group) that stores code executed by the processor hardware.

The module may include one or more interface circuits. In some examples, the interface circuit(s) may implement wired or wireless interfaces that connect to a local area network (LAN) or a wireless personal area network (WPAN). Examples of a LAN are Institute of Electrical and Electronics Engineers (IEEE) Standard 802.11-2020 (also known as the WIFI wireless networking standard) and IEEE Standard 802.3-2015 (also known as the ETHERNET wired networking standard). Examples of a WPAN are IEEE Standard 802.15.4 (including the ZIGBEE standard from the ZigBee Alliance) and, from the Bluetooth Special Interest Group (SIG), the BLUETOOTH wireless networking standard (including Core Specification versions 3.0, 4.0, 4.1, 4.2, 5.0, and 5.1 from the Bluetooth SIG).

The module may communicate with other modules using the interface circuit(s). Although the module may be depicted in the present disclosure as logically communicating directly with other modules, in various implementations the module may actually communicate via a communications system. The communications system includes physical and/or virtual networking equipment such as hubs, switches, routers, and gateways. In some implementations, the communications system connects to or traverses a wide area network (WAN) such as the Internet. For example, the communications system may include multiple LANs connected to each other over the Internet or point-to-point leased lines using technologies including Multiprotocol Label Switching (MPLS) and virtual private networks (VPNs).

In various implementations, the functionality of the module may be distributed among multiple modules that are connected via the communications system. For example, multiple modules may implement the same functionality distributed by a load balancing system. In a further example, the functionality of the module may be split between a server (also known as remote, or cloud) module and a client (or, user) module. For example, the client module may include a native or web application executing on a client device and in network communication with the server module.

The term code, as used above, may include software, firmware, and/or microcode, and may refer to programs, routines, functions, classes, data structures, and/or objects. Shared processor hardware encompasses a single microprocessor that executes some or all code from multiple modules. Group processor hardware encompasses a microprocessor that, in combination with additional microprocessors, executes some or all code from one or more modules. References to multiple microprocessors encompass multiple microprocessors on discrete dies, multiple microprocessors on a single die, multiple cores of a single microprocessor, multiple threads of a single microprocessor, or a combination of the above.

Shared memory hardware encompasses a single memory device that stores some or all code from multiple modules. Group memory hardware encompasses a memory device that, in combination with other memory devices, stores some or all code from one or more modules.

The term memory hardware is a subset of the term computer-readable medium. The term computer-readable medium, as used herein, does not encompass transitory electrical or electromagnetic signals propagating through a medium (such as on a carrier wave); the term computer-readable medium is therefore considered tangible and non-transitory. Non-limiting examples of a non-transitory computer-readable medium are nonvolatile memory devices (such as a flash memory device, an erasable programmable read-only memory device, or a mask read-only memory device), volatile memory devices (such as a static random access memory device or a dynamic random access memory device), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. Such apparatuses and methods may be described as computerized or computer-implemented apparatuses and methods. The functional blocks and flowchart elements described above serve as software specifications, which can be translated into the computer programs by the routine work of a skilled technician or programmer.

The computer programs include processor-executable instructions that are stored on at least one non-transitory computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C #, Objective-C, Swift, Haskell, Go, SQL, R, Lisp, Java®, Fortran, Perl, Pascal, Curl, OCaml, JavaScript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

The invention claimed is:

1. A computer-implemented method for classifying network traffic using machine learning, the computer-implemented method including:
   accessing processed network data, wherein:
      the processed network data includes a plurality of groups,
      each group includes a plurality of URL data objects, and
      each group is associated with an entity;
   generating a dynamic intent score for each group of the plurality of groups by:
      generating a comparison value for each URL data object within the group by:
         extracting data from a webpage associated with a URL data object,
         generating a first scraped text data object based on the extracted data,
         creating an embedding vector by providing the scraped text data object to a machine learning module, and
         generating a comparison value by comparing the embedding vector with a reference embedding vector, wherein the reference embedding vector is based on at least one of text input by a user at a user interface or text extracted from a file uploaded by the user at the user interface,
      selecting comparison values for the URL data objects within the group, and
      generating the dynamic intent score by averaging the selected comparison values; and
   ranking groups of the plurality of groups according to their respective dynamic intent scores.

2. The computer-implemented method of claim 1 wherein creating the embedding vector includes:
   generating an input vector based on the scraped text data object;
   providing the input vector to a trained neural network to generate an output vector; and
   saving the output vector of the trained neural network as the embedding vector.

3. The computer-implemented method of claim 2 wherein the trained neural network includes:
   an input layer having a plurality of nodes;
   one or more hidden layers having a plurality of nodes; and
   an output layer having a plurality of nodes.

4. The computer-implemented method of claim 3 wherein:
   each node of the input layer is connected to at least one node of the one or more hidden layers;
   each node of the input layer represents a numerical value; and
   the at least one node of the one or more hidden layers receives the numerical value multiplied by a weight as an input.

5. The computer-implemented method of claim 4 wherein the at least one node of the one or more hidden layers receives the numerical value multiplied by the weight and offset by a bias as the input.

6. The computer-implemented method of claim 5 wherein the at least one node of the one or more hidden layers is configured to:
sum inputs received from nodes of the input layer;
provide the summed inputs to an activation function; and
provide an output of the activation function to one or more nodes of a next layer.

7. The computer-implemented method of claim 1 wherein the embedding vector is associated with a first vector and the reference embedding vector is associated with a second vector.

8. The computer-implemented method of claim 7 wherein the comparison value includes results of a cosine similarity taken between the first vector and the second vector.

9. The computer-implemented method of claim 8 wherein the comparison value is in a range of between −1 and 1.

10. The computer-implemented method of claim 8 wherein the comparison value is in a range of between about 0 and about 1.

11. The computer-implemented method of claim 1 wherein each URL data object includes:
an Internet Protocol (IP) address string;
a Uniform Resource Locator (URL) string; and
an identifier of the group associated with the IP address.

12. The computer-implemented method of claim 1 wherein each URL data object includes:
a cookie ID string;
a Uniform Resource Locator (URL) string; and
an identifier of the group associated with the cookie ID string.

13. The computer-implemented method of claim 1 wherein the reference embedding vector is generated by:
generating an input vector based on the text input by the user at the user interface;
providing the input vector to a trained neural network to generate an output vector; and
saving the output vector of the trained neural network as the reference embedding vector.

14. The computer-implemented method of claim 1 wherein the reference embedding vector is generated by:
generating an input vector based on the text extracted from the file uploaded by the user at the user interface;
providing the input vector to a trained neural network to generate an output vector; and
saving the output vector of the trained neural network as the reference embedding vector.

15. The computer-implemented method of claim 14 wherein the text is extracted from the file using optical character recognition (OCR).

16. The computer-implemented method of claim 1 wherein the reference embedding vector is generated by:
generating an input vector based on text extracted from a topic list;
providing the input vector to a trained neural network to generate an output vector; and
saving the output vector of the trained neural network as the reference embedding vector.

17. The computer-implemented method of claim 1 further comprising:
generating a stage score for each URL data object,
wherein the stage score is a numerical value indicating how closely a webpage matches a campaign description, and
wherein the stage score is generated by:
parsing text of the webpage associated with the URL data object to determine a number of times topics from a topic list appears in the text of the webpage;
determine a weight based on a distance between the webpage and the campaign description; and
generating the stage score by determining a number of times topics from the topic list appear in the text of the webpage.

18. The computer-implemented method of claim 17 further comprising generating an entity stage score for the selected group by aggregating stage scores of the URL data objects.

19. A system for classifying network traffic according to machine learning, the system comprising:
memory hardware configured to store instructions and one or more data stores including processed network data, wherein:
the processed network data includes a plurality of groups,
each group includes a plurality of URL data objects, and
each group is associated with an entity; and
processor hardware configured to execute the instructions, wherein the instructions include:
generating a dynamic intent score for each group by:
generating a comparison value for each URL data object within a group by:
extracting data from a webpage associated with a URL data object,
generating a first scraped text data object based on the extracted data,
creating an embedding vector by providing the scraped text data object to a machine learning module, and
generating a comparison value by comparing the embedding vector with a reference embedding vector, wherein the reference embedding vector is based on at least one of text input by a user at a user interface or text extracted from a file uploaded by the user at the user interface,
selecting highest comparison values for the URL data objects within the group, and
generating the dynamic intent score by averaging the selected highest comparison values; and
ranking groups of the plurality of groups according to their respective dynamic intent scores.

20. A non-transitory computer-readable medium comprising executable instructions for classifying network traffic according to machine learning, wherein the executable instructions include:
accessing processed network data, wherein:
the processed network data includes a plurality of groups,
each group includes a plurality of URL data objects, and
each group is associated with an entity;
generating a dynamic intent score for each group by:
generating a comparison value for each URL data object within a group by:
extracting data from a webpage associated with a URL data object,
generating a first scraped text data object based on the extracted data,
creating an embedding vector by providing the scraped text data object to a machine learning module, and generating a comparison value by comparing the embedding vector with a reference embedding vector, wherein the reference embedding vector is based on at least one of text input by a user at a user interface or text extracted from a file uploaded by the user at the user interface, selecting highest comparison values for the URL data objects within the group, and generating the dynamic intent score by averaging the selected highest comparison values; and ranking groups of the plurality of groups according to their respective dynamic intent scores.

\* \* \* \* \*